(12) United States Patent
Iny et al.

(10) Patent No.: US 10,505,849 B1
(45) Date of Patent: Dec. 10, 2019

(54) NETWORK TRAFFIC LOAD BALANCING

(71) Applicant: Cisco Technology, Inc., San Jose, CA (US)

(72) Inventors: Ofer Iny, Tel Aviv (IL); Eyal Michel Dagan, Zichron Yaakov (IL); Aviran Kadosh, Moreshet (IL)

(73) Assignee: Cisco Technology, Inc., San Jose, CA (US)

( * ) Notice: Subject to any disclaimer, the term of this patent is extended or adjusted under 35 U.S.C. 154(b) by 170 days.

(21) Appl. No.: 15/197,865

(22) Filed: Jun. 30, 2016

Related U.S. Application Data

(60) Provisional application No. 62/187,860, filed on Jul. 2, 2015.

(51) Int. Cl.
| | |
|---|---|
| *H04L 12/803* | (2013.01) |
| *H04W 28/06* | (2009.01) |
| *H04L 12/841* | (2013.01) |
| *H04L 12/801* | (2013.01) |
| *H04L 12/833* | (2013.01) |

(52) U.S. Cl.
CPC .......... *H04L 47/125* (2013.01); *H04L 47/283* (2013.01); *H04L 47/31* (2013.01); *H04L 47/34* (2013.01); *H04W 28/065* (2013.01)

(58) Field of Classification Search
CPC ......... H04L 47/10; H04L 47/30; H04L 47/11; H04L 47/12; H04L 47/22; H04L 47/2441; H04L 12/5602; H04L 2012/568; H04L 47/50; H04L 65/00; H04L 45/00; H04L 45/02

USPC ....... 370/349, 389, 229, 231, 235, 351, 360, 370/358, 396, 395.42, 395.5, 395.21
See application file for complete search history.

(56) References Cited

U.S. PATENT DOCUMENTS

| | | | |
|---|---|---|---|
| 6,611,527 B1 * | 8/2003 | Moriwaki | H04L 12/5601 370/412 |
| 7,486,678 B1 | 2/2009 | Devanagondi et al. | |
| 7,525,995 B2 | 4/2009 | Iny | |
| 8,310,935 B1 * | 11/2012 | Chakravorty | H04L 45/28 370/218 |
| 9,036,481 B1 * | 5/2015 | White | H04L 47/18 370/235 |
| 9,860,176 B2 * | 1/2018 | Liu | H04L 47/125 |
| 2014/0233399 A1 * | 8/2014 | Mann | H04L 41/0806 370/248 |

(Continued)

OTHER PUBLICATIONS

Kandula, Srikanth et al; "Dynamic Load Balancing Without Packet Reordering"; in ACM SIGCOMM Computer Communication Review; vol. 37 Issue 2, Apr. 2007; pp. 53-62.

(Continued)

*Primary Examiner* — Brenda H Pham

(57) ABSTRACT

In one embodiment, a load balancing method may comprise: assigning a plurality of packets of a flow to a plurality of segments according to a segmentation criterion, each segment including one or more packets of said plurality of packets, and at least one of the plurality of segments including more than one packet of the plurality of packets; tagging each packet of the plurality of packets with a segment sequence identifier to indicate to which segment the packet is assigned; and arranging the plurality of packets for transmission via an interconnect so that all packets belonging to a same segment will be transmitted via a same path.

35 Claims, 9 Drawing Sheets

(56) References Cited

U.S. PATENT DOCUMENTS

2015/0163144 A1    6/2015   Koponen et al.
2015/0215236 A1*   7/2015   Joshi .................... H04L 47/806
                                                          707/754
2017/0019168 A1*   1/2017   Menard .............. G02B 6/29395

OTHER PUBLICATIONS

Poojitha, P. et al; "Load-Balancing Multipath Switching System with Flow Slice"; in International Journal of Computer Trends and Technology (IJCTT); vol. 5, No. 4, pp. 195-199; Nov. 2013.
Shi, Lei et al; "Load-Balancing Multipath Switching System with Flow Slice"; IEEE Transactions on Computers, vol. 61, No. 3; pp. 350-365, Mar. 2012.
Keslassy, Isaac et al; "Maintaining Packet Order in Two-Stage Switches"; INFOCOM 2002. Twenty-First Annual Joint Conference of the IEEE Computer and Communications Societies Proceedings. IEEE (vol. 2 ), pp. 1032-1041 vol. 2.

* cited by examiner

Codepoints:

- 0: non - SLB
- 1: SLB - SSN0- NEOS
- 2: SLB - SSN0- EOS
- 3: SLB - SSN1- NEOS
- 4: SLB - SSN1- EOS
- 5: SLB - SSN2- NEOS
- 6: SLB - SSN2- EOS
- 7: reserved ingress, non- SLB egress

NETWORK TRAFFIC LOAD BALANCING

CROSS-REFERENCE TO RELATED APPLICATIONS

This application claims the benefit of priority from U.S. Provisional Application No. 62/187,860 which is hereby incorporated by reference herein.

TECHNICAL FIELD

Embodiments described herein generally relate to network traffic load balancing.

BACKGROUND

A network may be configured to interconnect a plurality of hosts, e.g. servers.

A datacenter fabric (DCF) may include a network, which may interconnect hosts, e.g. servers, within a datacenter.

The datacenter environment may be characterized by a large number, e.g., many 1000's, of interconnected servers, which may require high interconnect bandwidth, for example, at least 40 Gigabit per second (Gbps) per server.

A DCF may be implemented, for example, according to a spine leaf configuration with a CLOS interconnect topology, or any other configuration and/or topology.

According to the spine leaf configuration, the network may include a plurality of leaf switches (also referred to as "Top-of-Rack (TOR)" switches), which may be interconnected via a spine interconnect. The spine interconnect may include spine switches, including single-layer and/or multi-layer spine switches, which may be configured to support an overall capacity, e.g., a number of interconnected TORs, for example, given a base radix of the spine switch.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DESCRIPTION OF EXAMPLE EMBODIMENTS

Overview

Figure 1:
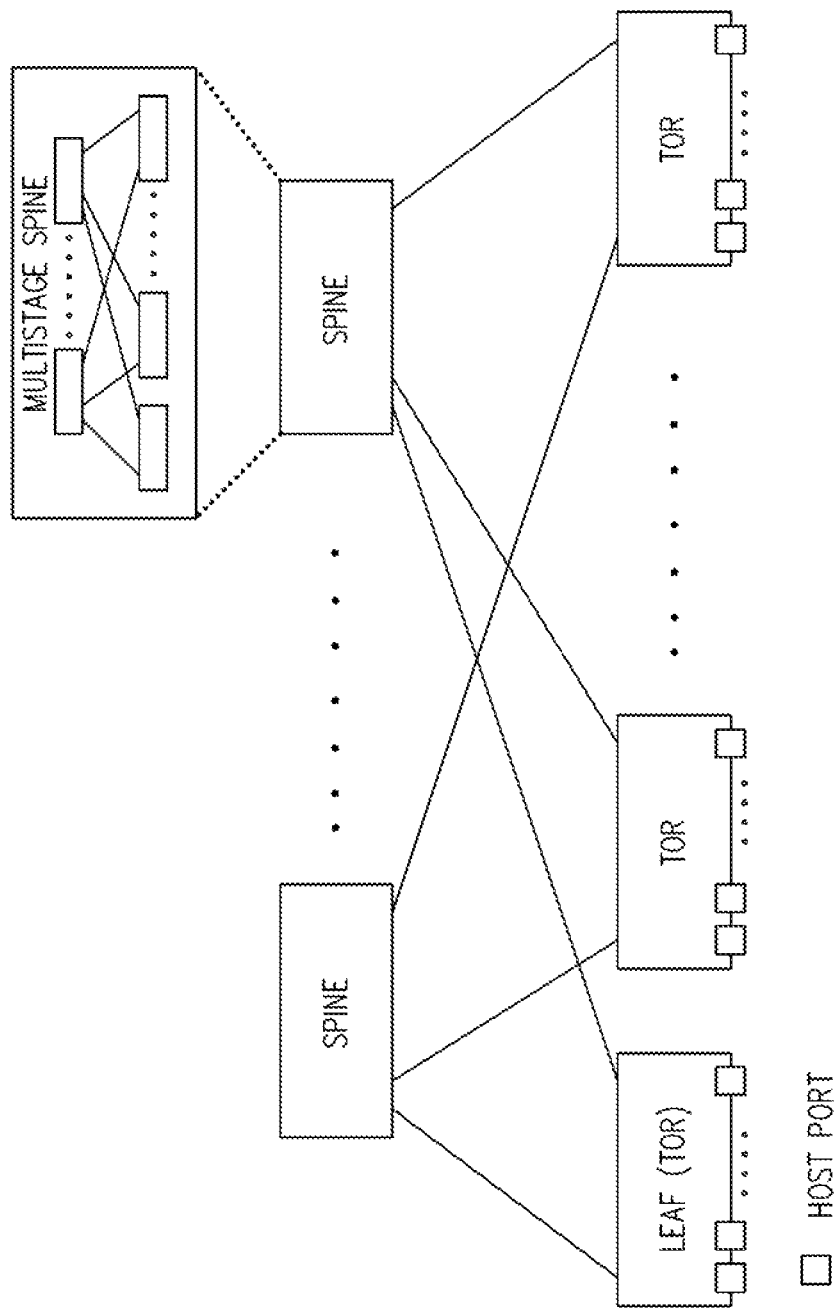
FIG. 1 is a schematic block diagram illustration of a system, in accordance with some demonstrative embodiments.

In some demonstrative embodiments, a load balancing method may comprise: assigning a plurality of packets of a flow to a plurality of segments according to a segmentation criterion, each segment including one or more packets of said plurality of packets, and at least one of the plurality of segments including more than one packet of the plurality of packets; tagging each packet of the plurality of packets with a segment sequence identifier to indicate to which segment the packet is assigned; and arranging the plurality of packets for transmission via an interconnect so that all packets belonging to a same segment will be transmitted via a same path.

In some demonstrative embodiments, a reordering method may comprise: receiving a plurality of packets of a flow via an interconnect, each packet of the plurality of packets tagged with a segment sequence identifier to indicate to which segment the packet is assigned; and reordering the plurality of packets of the flow based on the segment sequence identifier of each packet.

Example Embodiments

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of hardware, software or firmware or any combination of hardware, software and/or firmware, e.g. acting as a Load Balancer (also referred to as "Fabric Load Balancer") in accordance with any demonstrative embodiment or e.g. acting as a Reorderer in accordance with any demonstrative embodiment.

The terms "plurality" and "a plurality", as used herein, include, for example, "multiple" or "two or more". For example, "a plurality of items" includes two or more items.

The terms "flag", "tag", "indicate/indication", "mark", "label", encode/encoding, identify/identifier, or similar are used interchangeably herein.

The terms "operative to" and "configured to" are used interchangeably herein.

References to "one embodiment", "an embodiment", "demonstrative embodiments", "other embodiments", "various embodiments", "example", "instance", etc., indicate that the embodiment(s) so described may include a particular feature, structure, or characteristic, but not every embodiment necessarily includes the particular feature, structure, or characteristic. Further, repeated use of the phrase "in one embodiment", "demonstrative embodiments", etc. does not necessarily refer to the same embodiment(s), although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some demonstrative embodiments herein are described with respect to switches. However some demonstrative embodiments may be implemented additionally or alternatively with respect to other items such as host(s), "tunnel endpoints", etc.

Some demonstrative embodiments are described herein with respect to switches of a Datacenter Fabric (DCF) network. However some demonstrative embodiments may be implemented additionally or alternatively with respect to switches of any other network.

Some demonstrative embodiments are described herein with respect to Top-of-Rack (TOP) switches, e.g., of a spine leaf network. However some demonstrative embodiments may be implemented additionally or alternatively with respect to switches of any other type and/or of any other type of network.

Some demonstrative embodiments are described herein with respect to a network having a CLOS topology. However some demonstrative embodiments may be implemented additionally or alternatively with respect to a network having any other topology.

Reference is made to FIG. 1, which schematically illustrates a system, in accordance with some demonstrative embodiments.

In some demonstrative embodiments, the system of FIG. 1 may be configured to interconnect a plurality of hosts, for example servers.

In some demonstrative embodiments, the system of FIG. 1 may include, or may be implemented as part of, a datacenter fabric (DCF) network, which may interconnect hosts e.g. servers, within a datacenter.

For example, the datacenter environment may be characterized by a large number, e.g., many 1000's, of interconnected servers, which may require high interconnect bandwidth, for example, at least 40 Gigabit per second (Gbps) per server, or any other bandwidth.

In some demonstrative embodiments, the DCF network of FIG. 1 may be implemented, for example, according to a spine leaf configuration with a CLOS interconnect topology, or any other configuration and/or topology.

In some demonstrative embodiments, the network may include a plurality of leaf switches (also referred to as "Top-of-Rack (TOR)" switches), which may be interconnected via a spine interconnect. The spine interconnect may include spine switches, including single-layer or multi-layer spine switches, which may be configured to support an overall capacity, e.g., a number of interconnected TORs, for example, given a base radix of the spine switch.

In some demonstrative embodiments, the CLOS topology, and/or other DCF topologies, may be characterized by having many paths between any pair of TORs. Efficient use of all of the paths may enable, for example, to obtain good performance.

For example, in the leaf-spine CLOS configuration, a load balancing mechanism may be configured to determine how traffic is sent across the spine interconnect between TOR switches.

In some demonstrative embodiments, one challenge of a load balancing mechanism may be to utilize all of the paths equally, or substantially equally, for example, while maintaining flow level packet order.

In some demonstrative embodiments, a switch such as a TOR may be characterized from a packet path point of view. For example, an ingress-switch such as an ingress-TOR may include a switch (e.g. TOR) where a packet is received from a host (also referred to as source host); and/or an egress-switch such as an egress-TOR may include a switch (e.g. TOR) where a packet it transmitted to the host (also referred to as destination host). It is noted that the same switch may act as an ingress switch and/or as an egress switch depending on the packet. For example, if a packet is both received from a host and transmitted to a host from the same switch, then the switch may function as both an ingress and egress switch for that packet. As another example, when a given packet is received from a host by a certain switch, and another packet is transmitted from a host by that switch, then for the given packet the switch may act as an ingress switch and for the other packet the switch may act as an egress switch. Similarly, it is noted that a particular host may act as a source host (also referred to herein as "ingress host") and/or as a destination host (also referred to herein as "egress host") depending on the packet.

In some demonstrative embodiments, a packet may be communicated through the DCF network, for example, via a path, which may be determined by a forwarding decision that every node in the packet path makes.

In some demonstrative embodiments, a load-balancing scheme may be configured, for example, to make a forwarding decision with respect to multiple options for making a forwarding decision.

In some demonstrative embodiments, in a CLOS configuration, an ingress switch such as an ingress-TOR may assign a flow of packets to a path, for example, by assigning the flow to an output port, which may be selected from a set of possible ports, e.g., towards a spine switch. The spine switch may then assign the flow to a possible output port of the spine switch.

In some demonstrative embodiments, a host may be attached to the DCF with more than one port, e.g., in a dual homing scheme, wherein a host may be connected to two switches such as TORs. In some of these embodiments, load balancing, e.g., path selection, may also involve the host itself and possibly an egress switch (e.g. egress-TOR), e.g. as described below In some demonstrative embodiments, a (source) host may additionally or alternatively assign a flow of packets to a path, e.g. by setting an entropy label and/or a virtual local area network (VLAN) tag.

In some demonstrative embodiments, flow load balancing may involve classifying packets to flows based, for example, on the content of a packet, e.g., consistent with the requirement that that packet order needs to be maintained only for packets that belong to the same flow. When packet classification to flows results in many flows between two endpoints, e.g., hosts such as servers, different paths between two endpoints may be utilized simultaneously, for example, by assigning flows to paths, e.g., without harming overall packets ordering requirement.

In some demonstrative embodiments, for example, in case of TCP/IP or UDP/IP, a finest grained classification to flow is the socket (native socket), which is identified by the 5-tuple of: Destination-IP-Address; Source-IP-Address; Source-Port; Destination-Port; and Protocol (when tunneling is employed, the IP header of the tunnel may be used instead of the native socket). The fields selected as the flow discriminators are referred to as the Flow Vector. In one example, the size of the flow Vector, e.g., in case of 5-tuple IPv4, is 104-bits (b). Any other vector size may be used. In some of these embodiments, at least this information may be used to directly identify the flow, e.g., as described below. In some other of these embodiments, any other additional or alternative information may be used to identify the flow.

In some demonstrative embodiments, since the number of simultaneously active flows may usually be much lower than the flow vector space, it may be safe to identify the flow with a Flow Signature, which is a hash of the Flow Vector. For example, with a 32b Flow Signature, the likelihood that two active flows will map to the same signature is insignificantly low. Thus, if flow load balancing is made tolerant/indifferent of such rare collisions (even with some small loss of functionality) it may be advantageous to use the flow signature instead of the flow vector.

In some demonstrative embodiments, static flow load balancing, for example, using an Equal-Cost Multi-Path (ECMP) routing scheme, may provide a relatively simple way to load balance flows, for example, by using the Flow Signature directly to select a path for every packet of a flow. For example, a port may be selected by dividing the signature by the number of possible output ports and using the remainder (modulo) to select one port. This way the path a flow is assigned is "hardwired" to the numerical value of the flow signature.

In some demonstrative embodiments, ECMP load balancing may be significantly better than assigning all traffic between two endpoints (e.g. two hosts, or two tunnel endpoints) to one path. However, the ECMP load balancing may be far from optimal and its performance is highly dependent on the flow mix and/or the number of active flows. For example, if there are "many" flows and the "right" traffic distribution across flows, utilization maybe excellent. However, the "wrong" traffic mix may result is low utilization. In practice, in a typical DCF environment ECMP based load balancing may provide, for example, about 30% to 40% utilization of the raw interconnect bandwidth. This means that there is much room for improvement, e.g., by using one or more other load balancing methods.

In some demonstrative embodiments, a Flowlet Load Balancing (FLB) scheme may use the Flow Signature value indirectly to select a path. This scheme may enable taking into consideration, for example, dynamic path load and/or congestion levels, e.g., when assigning a path to a flow. Furthermore, this scheme may enable taking advantage of a "long enough" quiet period (also referred to as period of inactivity) in a flow to reassign the flow to a new path.

In some demonstrative embodiments with FLB, moving a flow to a different path, for example, absent any reordering scheme (such as at the egress switch e.g. TOR, destination host, or tunnel endpoint) may be allowed, for example, whenever it may be guaranteed that a first packet assigned to the new path will not overtake the last packet assigned to the old path. For example, moving a flow to a different path, for example, absent any reordering scheme (such as at the egress switch e.g. TOR, destination host, or tunnel endpoint) may be allowed, when a time skew between the old and new paths is less than an inter-packet gap. A simpler criterion to guarantee order, may require that there be no packets that belong to the flow in the fabric (downstream of the load balancing point) when assigning the flow to a new path.

In some demonstrative embodiments, FLB may view a flow as a sequence of flowlets, where a flowlet may include, for example, one or more packets that belong to the flow having an inter-packet gap that is less than a minimum gap, which may be required to allow for reassigning the flow to a new path, e.g., without risking disorder at the receiving endpoint.

In some demonstrative embodiments, for a flowlet to end and a new one to start, the quiet period between two flowlets (also referred to as inter-packet gap) may be required to be greater, for example, than the time skew between an old flowlet path and a new flowlet path.

In some demonstrative embodiments, the start of a flowlet may present an opportunity to reassign the flow to another path. The efficiency of FLB may be, for example, a function of at least the overall number of flows and the bandwidth distribution among them, and/or the number of opportunities there are to rebalance a flow. The number of opportunities to rebalance a flow may be dependent on the number of quiet periods. Relying on naturally occurring quiet periods in the incoming flow may result in the efficiency of flowlet load balancing being highly dependent on the traffic characteristics, and/or on the (minimum gap) value required for a period to be considered a quiet period. Although using the worst-case-fabric-delay as a minimum gap value for the Quiet Period may be a safe way, it may be sub-optimal, for example, since the worst-case may be a "large" number, and may result in little opportunity to load-balance flows. Alternatively, forcing a quiet period on a flow may require storing packets that belong to the flow in a buffer at the load balancing point, e.g., at the fabric-ingress TOR, the (source) host, or tunnel endpoint, for example, until the required quiet period elapses. In some implementations, this scheme may be somewhat costly in terms of (e.g. buffer) hardware. In some scenarios, this scheme may be self-defeating, since by applying a too-long Inactive Quiet Period Threshold (or in other words minimum gap), the overall bandwidth utilization may actually decrease.

In some demonstrative embodiments FLB, may be implemented only at the load balancing point (such as ingress-switch e.g. TOR only, host only, tunnel endpoint only) while switches along the interconnect may continue to apply ECMP load balancing. The term "interconnect" is used herein to refer to any type of interconnect between the load balancing and reordering points, such as a spine interconnect, a data center fabric interconnect between hosts (e.g. including ingress/egress switches and a spine interconnect), etc. The term "load balancing point" is used herein to refer to the point where load balancing occurs before the interconnect. It is possible that in some cases, subsequent load balancing may occur along the interconnect.

In some demonstrative embodiments, applying FLB at the load balancing point and ECMP along the interconnect may be sufficient to get most of the potential gain from the FLB strategy. For example, in some of these embodiments the load balancing point may be in the ingress-TOR and the ingress-TOR may have a much bigger set of possible output ports than e.g., a spine switch. One way to further improve this, e.g., without requiring that the switches along the interconnect (e.g. spine switches) implement FLB, may be to insert an entropy label and/or VLAN tag in the packet. The entropy label may be added, for example, to the flow-vector by spine ECMP functionality, thus effecting the port selection of the spine switches. Path control may be exercised at the load balancing point (e.g., in the ingress-TOR), for example, by having the entropy label set per flowlet, e.g., randomly, by the ingress TOR FLB functionality.

In some demonstrative embodiments, in a Packet-by-Packet load-balancing (PLB) scheme, every packet may be assigned a path, e.g., by selecting an output port, for example, independently at the load balancing point, and flow level order may be restored at a reordering point, (e.g. in the egress TOR or flow endpoint host (also referred to as destination host), or tunnel endpoint).

In some demonstrative embodiments, one simple PLB strategy may be to randomly select a port out of a set of options. Other PLB strategies may take into consideration the load on the (destination) output ports, and possibly the congestion level of the potential paths through the spine fabric.

In some demonstrative embodiments, PLB may provide near perfect load balancing. However, a PLB scheme may require cooperation between the load balancing and reordering points, e.g. in ingress and egress switches (e.g. TORs), hosts, and/or tunnel endpoints. For instance, the ingress switch (e.g. TOR), host, or tunnel endpoint may tag each packet with data, e.g., a packet sequence number, and/or some flow identifier, which may be required by the egress switch (e.g. TOR), host, tunnel endpoint to restore the flow packet order. Since in this instance packet-by-packet reordering may be applied, for instance at the egress switch e.g. TOR, classification to flows at the load balancing point, for instance at the ingress switch e.g. ingress TOR, may not need to consider how the spine interconnect load balances the flow packets. In one example, the only requirement related to the flow classification may be that all the flow packets pass/transit through one egress reordering point. This may be easily implemented, for example, when the reordering is done at the endpoint (e.g. host or tunnel endpoint). When reordering is implemented at the egress switch (e.g. TOR), it may be required that all packet of a given flow must pass through one egress switch (e.g. TOR) on their way to the endpoint (e.g. host or tunnel endpoint).

In some demonstrative embodiments, in the case of dual homing, where an endpoint such as a host is attached to two TORs, it may not always be possible to classify packets to flows in a way that guarantees that all the flow packets traverse one of the two TORs. To enable dual homing, the pair of TORs to which a dual-homed host is attached may be connected to each other, and for each flow, one of the TORs may be designated as a reordering TOR (a.k.a., merge-point). With this scheme, packets that belong to a flow that arrive at the TOR that is not the designated reordering TOR may be switched to the designated reordering TOR. Thus, the designated reordering TOR may receive all the packets that belong to a given flow, and reorder the flow in the same way as non-dual-homing configuration.

In some demonstrative embodiments, reordering, for instance at the egress switch e.g. TOR, packets that were packet load balanced may be a difficult problem to solve with hardware at high speed. This may especially be the case when dealing with a large-scale network with hundreds of TORs, and thousands of flows. However, absent packet loss, the reordering, while still a challenge, may be relatively straightforward. The reordering may operate by identifying the flow each packet belongs to, and maintaining state information per flow that includes the expected-next-packet-sequence-identifier (e.g. expected-next-packet-sequence-number). Using this information, packets may be buffered and read out of the buffer according to the e.g. sequence number.

In some demonstrative embodiments, when packet loss may occur, the reordering problem may become significantly more difficult. This is since identifying packet loss may be difficult, especially when the spine network internally has multiple paths. One way to detect packet loss may be to apply a time-out timer. A timeout threshold may be for example set based on a worst-case-skew (WCS) between two paths (e.g. between old and new paths, between any two paths) through the fabric. However, this may result in a large delay and buffering requirement whenever a packet is lost.

Thus, in some demonstrative embodiments use of PLB may require an environment with relatively low packet loss. Such an environment may be created, for instance by carefully controlling the congestion within the spine network, and by quickly recovering from link failures.

Some demonstrative embodiments may provide a scheme of load balancing traffic in a network, e.g., across the fabric, including a scheme of load balancing of segments at the load balancing point. This scheme of load balancing may be configured to provide, for example, at least near to PLB level of efficiency, for example, while lowering the reordering logic complexity at the reordering point, (e.g. at the egress-TOR destination host, or tunnel endpoint) e.g., in a large scale network.

In some demonstrative embodiments, this scheme of load balancing may be configured to provide increased resilience to packet loss, e.g., compared to PLB; to provide a reduced amount of load balancing related per-packet information to be sent to the reordering point (such as at the egress-switch (e.g. TOR), destination host, or tunnel endpoint), for instance compared to PLB; and/or one or more other additional or alternative advantages and/or functionalities, as will be understood from the description herein.

In some demonstrative embodiments, one or more elements of a network, e.g., the DCF network of FIG. 1 and/or any other network, may be configured to implement a segment load balancing (SLB) scheme, which may include load balancing of segments of flows, e.g., as described below.

In some demonstrative embodiments, a segment of a flow may include one or more packets, and may be defined by its length in time (also referred to as segment time duration) and/or size. For instance the size may be expressed in number of packets (also referred to as segment number of packets), and/or number of bytes (also referred to as segment number of bytes) e.g., as described below. In some of these embodiment, at least one segment per flow may include a plurality of packets.

In some demonstrative embodiments, most or all of the segments of a flow may include a plurality of packets. However, it is possible that in some of these embodiments, one or more segments of a flow may include only one packet, for example if the flow is ending or entering a period of inactivity.

In some demonstrative embodiments, packets of a flow may be assigned to a plurality of segments according to a segmentation criterion. The segmentation criterion may be any appropriate segmentation criterion. For example, in some of these embodiments, the segmentation criterion may relate, for instance to segment time duration, and/or for instance to size (e.g. segment number of bytes and/or to segment number of packets). For example, packets may be assigned to a segment, so that the segment may be longer than a minimum length in time (also referred to as minimum time duration) and/or may have a minimum number of bytes and/or a minimum number of packets, e.g., as described below.

In some demonstrative embodiments, SLB may be performed in a way so as to arrange that, for example, all packets that belong to the same segment are sent through the same path between the load balancing and reordering endpoints (also referred to as load balancing and reordering points), e.g., as described below. According to these embodiments, the reordering complexity at the reordering point (e.g. egress-TOR, destination host or tunnel endpoint) may be reduced, and/or packet loss resilience may be increased, e.g., compared to the PLB scheme.

In some demonstrative embodiments, SLB may be implemented, for example, at a load balancing point such as in an ingress switch (e.g., in an ingress-TOR), in a source host, or in a tunnel endpoint e.g., as described below. An apparatus for load balancing which may comprise hardware, software or firmware or any combination of hardware, software and/or firmware and which may (at least) implement SLB at the load balancing point may be referred to herein as a Load Balancer (or equivalently as a Fabric Load Balancer). A Load Balancer may be included, for example, in a (ingress) switch (also referred to for simplicity's sake as being "at a (ingress) switch"). A Load Balancer may be included for example, in a (source) host (also referred to for simplicity's sake as being "at a (source) host"). A Load Balancer may be included, for example in a tunnel endpoint (also referred to for simplicity's sake as being "at a tunnel endpoint). For instance, if the Load Balancer is at the host, the Load Balancer may be included anywhere in the host, such as in a virtual machine or in a network interface card of the host. For simplicity's sake, the Load Balancer is also referred to herein at being at the load balancing point.

In some demonstrative embodiments, the Load Balancer at the load balancing point such as at an ingress switch, e.g., the ingress TOR, at the source host, or at a tunnel endpoint may be configured to segment a flow according to segmentation criterion (e.g. including one or more segment rules), such as described below, to tag packets with a sequence identifier (e.g. number), and if relevant an end of segment (EOS) flag and/or other flag(s)/tag(s), e.g. as described below, and to arrange that all packets of the same segment will be transmitted via the same path, e.g. by arranging that the packets will be transmitted through the same output port towards a spine switch, e.g. by tagging the packets the same entropy label and/or with the same VLAN tag, e.g., as described below.

For example, all packets of a given segment may be assigned the same segment sequence identifier (e.g. number) and the final packet of the segment may be identified as the end of segment packet. It is possible, however, that the final packet of a given segment may not necessarily be marked as an end of segment packet, e.g. if a flow ends or if a flow experiences a "long enough" quiet period, effectively ending the flow from the perspective e.g. of the ingress switch, source host, or tunnel endpoint.

In some demonstrative embodiments, where SLB is implemented at the (source) host an entropy label or VLAN tag may be used to control the path of the packet through the DCF.

In some demonstrative embodiments, reordering may be implemented at a reordering point e.g. in an egress switch e.g. egress-TOR, in a destination-host or in a tunneling endpoint. An apparatus for reordering which may comprise hardware, software or firmware or any combination of hardware, software and/or firmware, and which may implement reordering at least for packets that had SLB applied at the load balancing point may be referred to as a Reorderer. A Reorderer may be included, for example, in a (egress) switch (also referred to for simplicity's sake as being "at a (egress) switch). A Reorderer may be included, for example, in a (destination) host (also referred to for simplicity's sake as being "at a (destination) host"). A Reorderer may be included, for example in a tunnel endpoint (also referred to for simplicity's sake as being "at a tunnel endpoint). For instance, if the Reorderer is in the host, the Reorderer may be included anywhere in the host, such as in a virtual machine or network interface card of the host. For simplicity's sake, the Reorderer is also referred to herein at being at the reordering point.

In some demonstrative embodiments, the Reorderer may reorder the packets according to the segment-sequence-identifier, e.g. segment sequence number. For example, an EOS flag may be used by the Reorderer to determine when the final packet of a segment is forwarded thus making the "next" segment packets eligible for forwarding.

In some demonstrative embodiments, SLB may be sensitive only to EOS packet loss (rather than to any packet loss e.g. as in the case of PLB). Since the number of EOS packets may be small by traffic volume, with only one per segment, it may be practical in some of these embodiments to tag EOS packets with a drop-precedence code point that makes EOS packets less likely to be dropped by the network. Usage of the drop-precedence code point for an EOS packet may greatly reduce the likelihood of EOS packet loss due to buffer overflow, arguably the most likely cause of packet loss.

In some demonstrative embodiments, the Load Balancer at the load balancing point such as at an ingress switch, e.g., the ingress TOR, at the source host, or at a tunnel endpoint may be configured to assign a packet to a segment, and to keep assigning one or more subsequent packets to the same segment, for example, in accordance with the segmentation criterion (or in other words as long as the segment rules are fulfilled), e.g., as described below.

In some demonstrative embodiments, the Load Balancer at such as at an ingress switch, e.g., the ingress TOR, at the source host, or at a tunnel endpoint may be configured to determine that a packet is to be assigned as a final (or in other words last) packet of a segment, for example, in accordance with a segmentation criterion (or in other words upon fulfillment of rule(s) for ending the segment) e.g., as described below.

In some demonstrative embodiments, the rule(s) for ending the segment may be related to a timing of sending a packet relative to a timing of sending the first packet of the segment, e.g., as described below.

In some demonstrative embodiments, the Load Balancer at a load balancing point such as at an ingress switch, e.g., the ingress TOR, at the source host, or at a tunnel endpoint may be configured to keep adding packets to a segment, for example, as long as a difference between a time that a packet is sent via the interconnect and a time at which a first packet of the segment has been sent over the interconnect, is less than or equal to a time period (also referred to as minimum segment duration), e.g., as described below.

In some demonstrative embodiments, the Load Balancer at a load balancing point such as at an ingress switch, e.g., the ingress TOR, at the source host, or at a tunnel endpoint may be configured to assign one or more subsequent packets, e.g., subsequent to the final packet of the segment, to a subsequent segment, e.g., as described below.

In some demonstrative embodiments, packets switching through the spine interconnect may be assumed to be ECMP or flowlet load balanced by the spine switches, e.g., when multiple options exist. Thus, so as, for example, to guarantee that all packets that belong to the same segment arrive in order at a Reorderer at the Reordering point (e.g. at egress switch, e.g. egress TOR, destination host, or tunnel endpoint), a flow may be defined by the Load Balancer at the load balancing point (e.g., at ingress switch, e.g., ingress TOR, source host, or tunnel endpoint), for example, in such a way that packets belonging to a flow may always take the same path through the spine layer.

In one example, for example, in case of Internet Protocol (IP), this may be accomplished by defining an SLB flow at the load balancing point such as at an ingress switch, e.g., the ingress TOR, source host, or tunnel endpoint according to the native-socket flow classification.

In another example, in case of dual homing where the reordering is implemented at the egress switch (e.g. egress-TOR), a similar concept to packet-by-packet load balancing described above may be employed. For example, flows may be assigned a designated reordering TOR, and switched between the TOR pair as needed so that all the packets that belong to a given flow are received (and forwarded to the host) through the designated reordering TOR.

In some demonstrative embodiments, an efficiency of SLB may depend, for example, at least on the size of a segment, e.g., in term of a number of bytes. For example, the smaller the segment size the closer the SLB may become to PLB efficiency. On the other hand, the longer the segment the more dramatic may be the reduction in egress reordering complexity and/or the increase in resiliency to packet loss, e.g., compared to PLB.

In some demonstrative embodiments, a segment may be defined based on a segmentation criterion (e.g. including one or more segment rules), e.g., as described below. In other embodiments, the segment may be defined based on one or more additional or alternative parameters, rules and/or criteria.

In some demonstrative embodiments, the Load Balancer at a load balancing point such as at an ingress switch, e.g., the ingress TOR, at the source host, or at a tunnel endpoint may be configured to define a segment having a time duration (also referred to as length of time, length, or segment time duration, etc.) that is greater than the Worst-Case-Skew (WCS) between two paths (e.g. old and new path, or any two possible paths) between the load balancing point and reordering point (e.g. through the fabric to the destination). In this case the WCS may be considered to be the minimum time duration (also referred to as minimum length of time, minimum length, or minimum segment time duration, etc.). This definition of the segment may yield, for example, reduced reorder complexity and/or enhanced interconnect utilization. For example, this definition of the segment may provide simplification of the egress reordering functionality, for example, since it may enable to guarantee that at any one time the (egress) Reorderer "sees" (or in other words handles) at most two active segments from a flow, e.g., all packets from a given flow are from at most two different segments of that flow.

In some demonstrative embodiments, the Load Balancer at a load balancing point such as at an ingress switch, e.g., the ingress TOR, at the source host, or at a tunnel endpoint may be configured to define a segment with a time duration that is greater than the Worst-Case-Delay (WCD) for any path between the (ingress segment) Load Balancer and (egress segment) Reorderer. In this case the WCD may be considered to be the minimum time duration (also referred to as minimum length of time, minimum length or minimum segment time duration, etc.). For example, by making the Reorderer tolerant to a rare violation of the absolute WCD criteria, a significantly lower WCD threshold can result, e.g., WCD with a 10e-9 guarantee. This definition may be advantageous, e.g., compared to using an absolute WCD, for example, at least because it may result in smaller/shorter segments that yield greater efficiency.

In some demonstrative embodiments, the Load Balancer at a load balancing point such as at an ingress switch, e.g., the ingress TOR, at the source host, or at a tunnel endpoint may be configured to define a segment with a time duration that is greater than a configured value. In this case the configured value may be considered to be the minimum time duration. This value may be any value, but is typically although not necessarily larger than the WCS or WCD.

In some demonstrative embodiments, the use of WCS or WCD may simplify the handling of an EOS packet loss by the Reorderer. With a WCS and/or WCD segmentation rule, EOS packet loss for the earliest segment that is being handled by the Reorderer may be detected by the Reorderer based on the arrival of an EOS of a later segment, expiration of a timeout timer from the start of a later segment, arrival of a packet whose segment sequence identifier is indicative of a segment that is two segments or more after the earliest segment, expiration of a timeout timer from receipt of the most recently received EOS packet, and/or expiration of a timeout timer from the most recently received packet of a segment. For example, any of these (segment) timeout timers may be set to the minimum segment time duration (e.g. WCS or WCD), to the minimum segment time duration plus a margin, or to another value (e.g. 3× the WCS or WCD). In some cases, if any of these timers expire (or at least two expire) then it may indicate that a segment may have ended so if an EOS of that segment has not been received, the EOS packet may be considered to be lost. For instance, if the timeout timer from the start of a later segment expired then it may indicate that the earlier segment may have ended. For instance, if the timeout timer from the most recently received EOS packet expired, then it may indicate that the segment following the segment with the most recently received EOS packet may have ended. For instance, if the timeout timer from the most recently received packet of a segment expired then it may indicate that the segment may have ended. Other timeout timer(s) may be additionally or alternatively used. In addition, or instead certain packets may be tagged by the load balancer with a Close-Previous-Segment (CPS) flag. This flag may be set for a packet when a timer (usually set to a time equal to WCS/WCD) from the transmission of an EOS packet of the previous segment expires. When the Reorderer receives a packet with a CPS flag set, it may indicate that the previous segment may have ended, so if an EOS for the previous segment has not been received the EOS packet may be considered to be lost. Usage of a CPS flag may or may not result in a quicker recovery time from an EOS packet loss, compared to other manners of detection by the Reorderer, such as those described in this paragraph.

In some demonstrative embodiments, the Load Balancer at a load balancing point such as at an ingress switch, e.g., the ingress TOR, at the source host, or at a tunnel endpoint may be operative to apply only SLB, or may be operative to apply SLB and one or more other load balancing schemes (e.g. FLB and/or ECMP), e.g. as described below.

In some demonstrative embodiments, the Load Balancer at a load balancing point such as at an ingress switch, e.g., the ingress TOR, at the source host, or at a tunnel endpoint may be operative to apply SLB, FLB and/or ECMP, whereas along the interconnect if there is load balancing the load balancing may be in accordance with ECMP (and/or FLB).

In some demonstrative embodiments, the Load Balancer at a load balancing point such as at an ingress switch, e.g., the ingress TOR, at the source host, or at a tunnel endpoint may be configured to selectively apply SLB, for example, only to some flows, e.g., as described below.

In some demonstrative embodiments, the Load Balancer at a load balancing point such as at an ingress switch, e.g., the ingress TOR, at the source host, or at a tunnel endpoint may be configured to select, for example, to apply the SLB to packets of a flow of a first type, and to select, for example, not to apply the SLB, e.g., to apply another load balancing mechanism, to packets of a flow of a second type, e.g., as described below. In some of these embodiments, a given flow may start out as a flow of a first type and then transition to a flow of a second type, or vice versa, but in some other of these embodiments a flow may always remain of the same type.

In some demonstrative embodiments, the Load Balancer at a load balancing point such as at an ingress switch, e.g., the ingress TOR, at the source host, or at a tunnel endpoint may be configured to select to apply SLB, for example, only to flows that are Elephant flows and/or any other predefined type of flow.

In some demonstrative embodiments, an Elephant flow may be, for example, a flow that is relatively long lived with a high relative bandwidth. In some cases, a flow may not be initially determined to be an elephant flow, until e.g. the flow becomes relatively long lived with a high relative bandwidth, and then the flow may be determined to be an elephant flow. In some cases, a flow may be initially determined to be an elephant flow, for instance based on a field in the packet header, in accordance with a policy e.g. based on destination IP address, or in an overlay environment, based on the destination of the underlay tunnel, e.g., egress-TOR/destination-VTEP ("VXLAN tunnel endpoint").

In some demonstrative embodiments, for example, in datacenter networks, while multiple 1000s of flows may be simultaneously active through a given switch e.g. TOR, most traffic may be carried by a relatively small number of Elephant flows.

In some demonstrative embodiments, applying SLB only to elephant flows may enable, for example, to reduce the number of active flows that are SLB at any one time, for example, even without loss or without significant loss of efficiency.

In some demonstrative embodiments, applying SLB only to elephant flows may enable, for example, to reduce the number of SLB flows that the (egress) Reorderer may need to simultaneously handle at any one time, making the Reorderer database sizes more practical.

In some demonstrative embodiments, the SLB may be applied to one or more additional or alternative types of flows, e.g., in addition to or instead of Elephant flows.

In some demonstrative embodiments, methods of loading balancing and reordering may comprise: assigning a plurality of packets of a flow to a plurality of segments according to a segmentation criterion, each segment including one or more packets of said plurality of packets; tagging each packet of the plurality of packets with a segment sequence identifier to indicate a segment to which the packet is assigned; arranging the plurality of packets for transmission via an interconnect so that all packets belonging to a same segment will be transmitted via a same path; and reordering the plurality of packets of the flow based on the segment sequence identifier of each packet, e.g. as described below. For example in some of these embodiments the methods of load balancing may include, a method of load balancing and reordering traffic across an interconnect network having multiple paths between an ingress point, e.g., an ingress load balancing point, and an egress point, e.g., an egress reordering point, may include classification of packets to flows; segmenting at the ingress the flow into sets of one or more in-sequence packets according to one or more segmentation rules; tagging all packets of a flow with a segment sequence identifier of at least two states; at the ingress transmitting all packets that belong to the same segment via the same path (e.g. through the same output port); and reordering packets that belong to the same flow at the egress according to the segment sequence identifier, e.g., as described below.

In some demonstrative embodiments, the segmentation criterion (e.g. including one or more segment rules) may relate to segment time duration.

In some demonstrative embodiments, the segmentation criterion may additionally or alternatively require that a segment time duration be longer than a worst-case-skew between an old path and a new path from the load-balancing point to the reordering point, e.g., as described below.

In some demonstrative embodiments, the segmentation criterion may additionally or alternatively require that a segment time duration be longer than a worst-case-skew between any two paths from the load-balancing point to the reordering point, e.g., as described below.

In some demonstrative embodiments, the segmentation criterion may additionally or alternatively require that a segment time duration be longer than a worst-case-delay between any two paths from the load-balancing point to the reordering point, e.g., as described below.

In some demonstrative embodiments, the segmentation criterion may additionally or alternatively require that the segment time duration be longer than a function of the worst-case-delay, or a function of the worse-case-skew, e.g., as described below.

In some demonstrative embodiments, the segmentation criterion may additionally or alternatively relate to segment size, e.g. as described below.

In some demonstrative embodiments, the packets may be tagged with an End-of-Segment indication, e.g., as described below.

In some demonstrative embodiments, the packets may be tagged with a Segment Sequence Identifier, such as a Segment Sequence Number (SSN), e.g., as described below In some demonstrative embodiments, for example, in case of IP traffic, the flow classification may be according to the native-socket, e.g., as described below.

In some demonstrative embodiments, in case of dual-homing the switches e.g. TORs, connected to the same host/tunnel endpoint, may be interconnected, and flows may be assigned a designated reordering TOR, and packets that arrive at the non-designated TOR may be switched to the designated TOR, e.g., as described below.

In some demonstrative embodiments, an End-of-Segment indication may be used to identify when to update the expected (earliest) segment sequence identifier such as an SSN, e.g., as described below.

In some demonstrative embodiments, (segment) timeout timer(s) may be used to identify when a packet is lost, e.g., as described below.

In some demonstrative embodiments, an arrival at the Reorderer at an egress switch, e.g., an egress TOR, or at a destination host, of a packet with a segment sequence identifier indicative of a segment that is two or more later than the earliest segment being handled (e.g. SSN that is bigger than the expected SSN by two or more) may be used to identify when a packet is lost, e.g., as described below.

In some demonstrative embodiments, the SLB may be applied, for example, at least to flows that are dynamically identified as high bandwidth (Elephant) flows, e.g., as described below.

Figure 2:
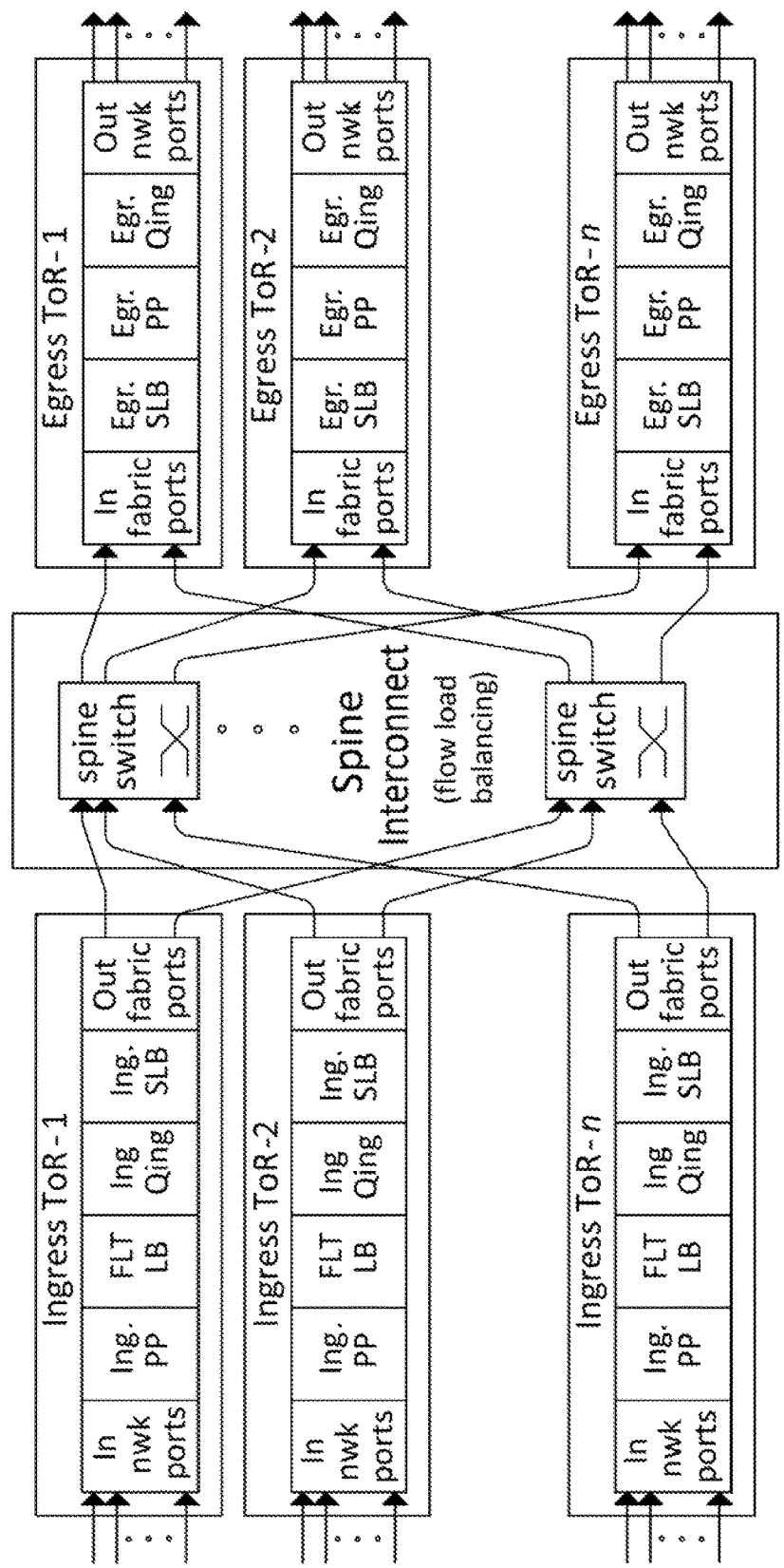
FIG. 2 is a schematic illustration of a plurality of interconnected Top of Rack (TOR) switches, in accordance with some demonstrative embodiments.

FIG. 2 is a schematic illustration of a plurality of interconnected Top of Rack (TOR) switches, in accordance with some demonstrative embodiments.

In some demonstrative embodiments, the TOR switches of FIG. 2 may include TOR switches of a datacenter network including a plurality of TORs interconnected by a Spine interconnect.

In some demonstrative embodiments, it may be assumed that there is a perfectly symmetrical CLOS configuration with a single layer of Spine switches, e.g., as described below. In other embodiments, the interconnect may not need to be completely symmetrical, and/or and the spine interconnect may have multiple hops.

In some demonstrative embodiments, as shown in FIG. 2, a network, e.g., a datacenter network, may include a plurality of TORs interconnected by a Spine switching network, where the SLB is implemented in the TORs.

In some demonstrative embodiments, as shown in FIG. 2, a TOR, e.g., each TOR, may include an ingress part (ingress TOR) and an egress part (egress TOR).

In some demonstrative embodiments, as shown in FIG. 2, a TOR may have network facing ports (also referred to as "network ports", "host facing ports" or "host ports") and fabric facing ports (also referred to as "fabric ports"). The network facing ports may be configured to be attached to hosts (e.g. servers); and/or the fabric facing ports may be configured to connect to spine switches.

In some demonstrative embodiments, as shown in FIG. 2, spine switches may be configured to interconnect the TOR switches. The spine switches may be referred collectively as the Spine Interconnect.

In some demonstrative embodiments, as shown in FIG. 2, the ingress TOR may receive packets via the network ports. The ingress TOR may include an Ingress Packet Processor (PP) configured to process the packets and to determine an output port. The output port may either be a network port, e.g., an output network port of the same TOR, or an output fabric port ("out fabric port").

In some demonstrative embodiments, the ingress TOR may be configured to apply a (fabric) load balancing scheme to the packets, for example, when the output port is a fabric port.

In some demonstrative embodiments, the (fabric) load balancing may be applied, for example, when there are multiple possible output fabric ports that the packet can be sent though.

In some demonstrative embodiments, as shown in FIG. 2, absent any faulty links, all the TORs may be connected to all the Spine switches, thus all the fabric facing ports may be equivalent for forwarding a packet between TORs. In some demonstrative embodiments, not all TORs may be connected to all other TORs via the Spine switches.

In some demonstrative embodiments, a fabric-load-balancing-group (fabric-LBG) may include a set of one or more fabric ports that are equivalent for forwarding a packet. A given fabric LBG may include all fabric ports of the ingress TOR, or a subset of the fabric ports of the ingress TOR. For example the LBG may be derived from the destination IP address of the packet, e.g. in accordance with network protocols. A flow signature to LBG identifier may be maintained once a flow is identified.

In some demonstrative embodiments, when the ingress TOR encounters a packet that is assigned a fabric-LBG, one member of the fabric LBG may be selected, for example, according to one or more load balancing principles and/or rules, for example, according to ECMP, Flowlet, or Segment load balancing principles, and/or any other principles.

In some demonstrative embodiments, the egress TOR may be configured to receive packets through a fabric port. The egress TOR may be configured to identify the received packets as either SLB or non-SLB.

In some demonstrative embodiments, the egress TOR may apply egress segment reordering, for example, if the packets are SLB packets.

In some demonstrative embodiments, the egress TOR may include an egress packet processor (PP) configured to process SLB packets, e.g., following the egress segment reordering, and non-SLB packets, for example, to determine the output port for the packets.

In some demonstrative embodiments, the egress TOR may include a plurality of egress queues ("Egr. Qing) configured to queue the packets processed by the egress PP, and to schedule and transmit the packets out of their output network ports.

Figure 3:
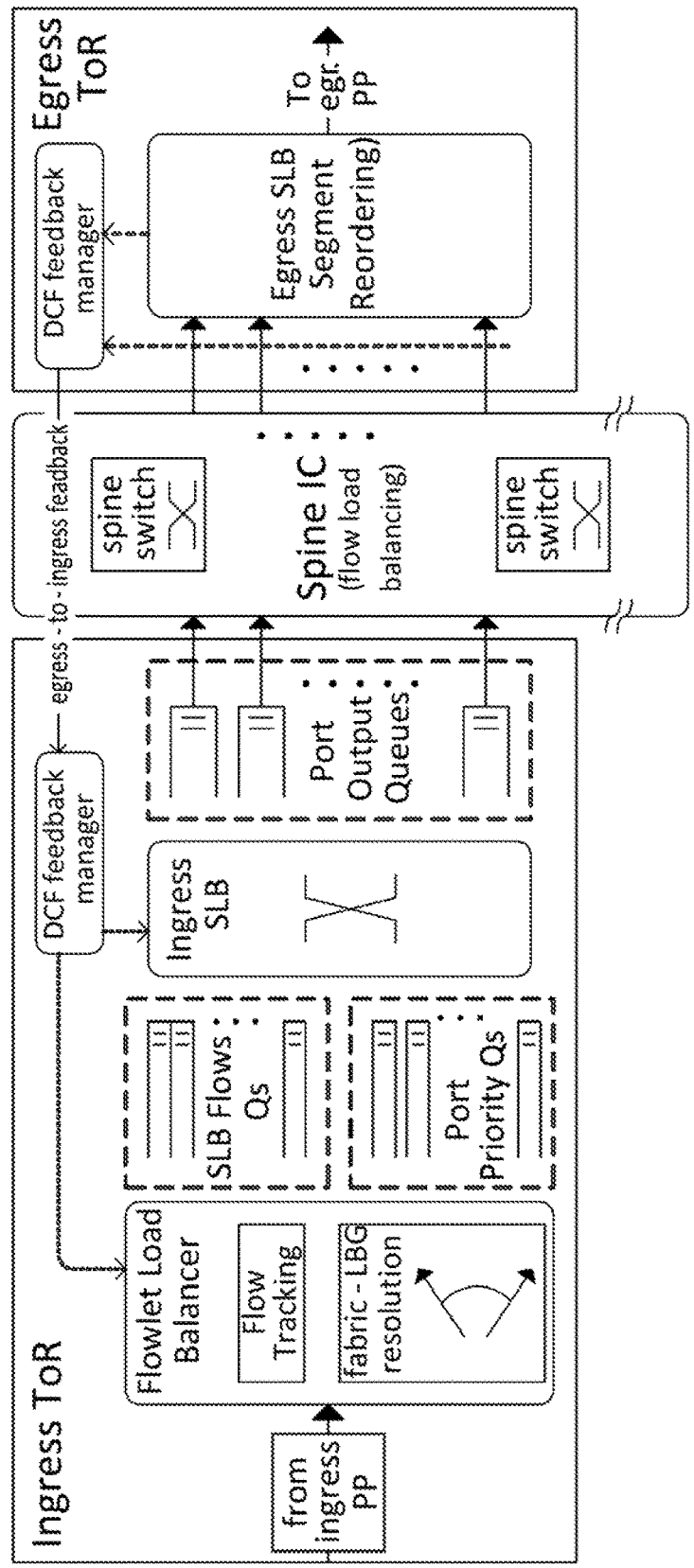
FIG. 3 is a schematic illustration of a load-balancing scheme, in accordance with some demonstrative embodiments.

FIG. 3 is a schematic illustration of a (fabric) load balancing and reordering scheme, in accordance with some demonstrative embodiments. For example, one or more operations and/or functionalities of the load balancing and/or reordering scheme of FIG. 3 may be implemented by the ingress TOR and/or egress TOR of FIG. 2.

In some demonstrative embodiments, as shown in FIG. 3, the ingress TOR may include a Fabric Load Balancer. For example, the Fabric Load Balancer may include a Flowlet Load Balancer, a Segment Load Balancer SLB, and/or memory (e.g., including Flows Queues ("Q"), Port Priority Queues ("Q"), and/or database(s)). After load balancing the packets may be queued in the port output queues of the output fabric ports.

Although FIG. 3 illustrates load balancing (by a Load Balancer) and reordering by a Reorderer) at ingress and egress TORs respectively, in some demonstrative embodiments, the Load Balancer may be at a source host or tunnel endpoint and/or the Reorderer may be at a destination host or tunnel endpoint. Reorderer is also referred to and shown in the figures as "Egr SLB", "Egress SLB" "or "Egress Reorderer".

In some demonstrative embodiments the Flowlet Load Balancer, may be configured to process, for example, packets for which the ingress PP encountered a fabric-LBG.

In some demonstrative embodiments, the Flowlet Load Balancer may be configured to track each flow, and to determine, e.g., using one or more parameters of the flow tracking information, which load balancing scheme is to be applied.

In some demonstrative embodiments, the Flowlet Load Balancer may be configured to select whether or not to apply the SLB scheme to a flow.

In some demonstrative embodiments, the Flowlet Load Balancer may be configured to select between SLB and one or more other load balancing schemes. For example, the Flowlet Load Balancer may be configured to select between SLB and one or more additional or alternative load balancing schemes.

In some demonstrative embodiments, the Flowlet Load Balancer may be configured to select between ECMP, Flowlet, or Segment load balancing.

In some demonstrative embodiments, the Flowlet Load Balancer may be configured to select that the SLB scheme is to be applied to at least one type of flows, and to select that the SLB scheme is not to be applied to at least one other type of flows. In some of these embodiments, a given flow may start out as a flow of a given type and then transition to a flow of a different type, or vice versa, but in some other of these embodiments a flow may always remain of the same type.

In some demonstrative embodiments, the Flowlet Load Balancer may be configured to select to apply the SLB scheme to all packets.

In some demonstrative embodiments, flows may be assigned to SLB according to statically configured rules. For example, in an overlay environment, based on the destination of the underlay tunnel, e.g., egress-TOR/destination-VTEP. As another example, flows may be assigned to SLB based on a field in the packet header, a policy based e.g. on destination IP address, etc.

In some demonstrative embodiments, flows may additionally or alternatively be dynamically assigned to SLB. For example, the flow tracking information may include one or more of the following flow attributes: flow rate, count of the number of packets since flow start, count of the number of bytes since flow start, time elapsed (also referred to as duration) since flow start or packet size distribution. This information may be used, for example, to determine when a flow is to be assigned to SLB.

In one example, the flow tracking information may be used to determine whether or not a flow is to be considered as an Elephant flow, thus making it eligible for SLB.

In other embodiments, the flow may be assigned to the SLB based on any other additional rules, parameters, and/or criteria.

In some demonstrative embodiments, (e.g. when a flow is not eligible for SLB, or does not match some configured rules, or is not considered Elephant), the flow may be load balanced using ECMP or Flowlet load balancing. In some of these embodiments, when not applying SLB and assuming there are no resource limitations that prevent the Flowlet Load Balancer from tracking the flow, the flow may be Flowlet load balanced. Flowlet Load Balancing may include, for example, identifying Flowlet boundaries and reassigning the flow to fabric port(s) (from the fabric LBG) on Flowlet boundaries. Otherwise, when not applying SLB, the flow may be ECMP load balanced.

In some demonstrative embodiments, packets belonging to ECMP or Flowlet load balanced flows may be stored in queues according to the selected output fabric port. These queues may be, for example, organized according to output fabric port and priority, e.g., using port-priority queues, as shown in FIG. 3. For instance, there may be a plurality of queues (e.g. 8) per output fabric port, corresponding to a plurality of priorities. Classification to priority may have been performed (e.g. by ingress packet processor) in any manner known in the art, such as based on a VLAN tag, IP header, etc. of the packet.

In some demonstrative embodiments, flows that are assigned to SLB may be stored in a flow specific SLB queue. It is noted that having a dedicated queue per SLB flow may not necessarily be a requirement for implementing SLB. However, having such a queue may enable making the path selection for SLB flows after reading packets from the queue (instead of before writing packets to the queue). Thus the delay due to the SLB queue (e.g. through the ingress-TOR) may be excluded from the WCD/WCS used to determine the minimum segment time duration. Having a dedicated queue per SLB flow may also enable advanced congestion management and fault handling.

In some demonstrative embodiments, where flows are eligible for SLB based on their Elephant status, a flow may transition to SLB from ECMP or Flowlet load balancing after the Flowlet Load Balancer determines that the flow is Elephant. When the transition to SLB occurs, an SLB Flow Queue may be assigned to the flow, and subsequent packets that belong to the flow may be stored in the assigned SLB Flow Queue. In some of these embodiments, the transition to SLB may also be conditional on encountering a Flowlet boundary. The inclusion of the Flowlet boundary as a condition for transitioning to SLB may not be necessary, However the condition of a Flowlet boundary may simplify the implementation since it may mean that when a path is selected for the first packet after the transition to SLB, no packets of the same flow may remain in either the port-priority queues or the interconnect (e.g. spine interconnect). Thus the Segment Load Balancer may be free to select any path immediately, e.g. regardless of previous path selection while Flowlet and/or ECMP load balancing was applied to the flow, and/or e.g. without having to be concerned with maintaining internal order between the paths through the port-priority queues and the SLB queue.

In some demonstrative embodiments, there may be (egress to ingress) feedback from the Reorderer to the Load Balancer (e.g. to Flowlet Load Balancer and/or to Segment Load Balancer), e.g. managed by one or more feedback manager(s) at the ingress and/or egress. Such feedback may allow recovery for link/port failure and/or errors at the Reorderer.

Figure 4:
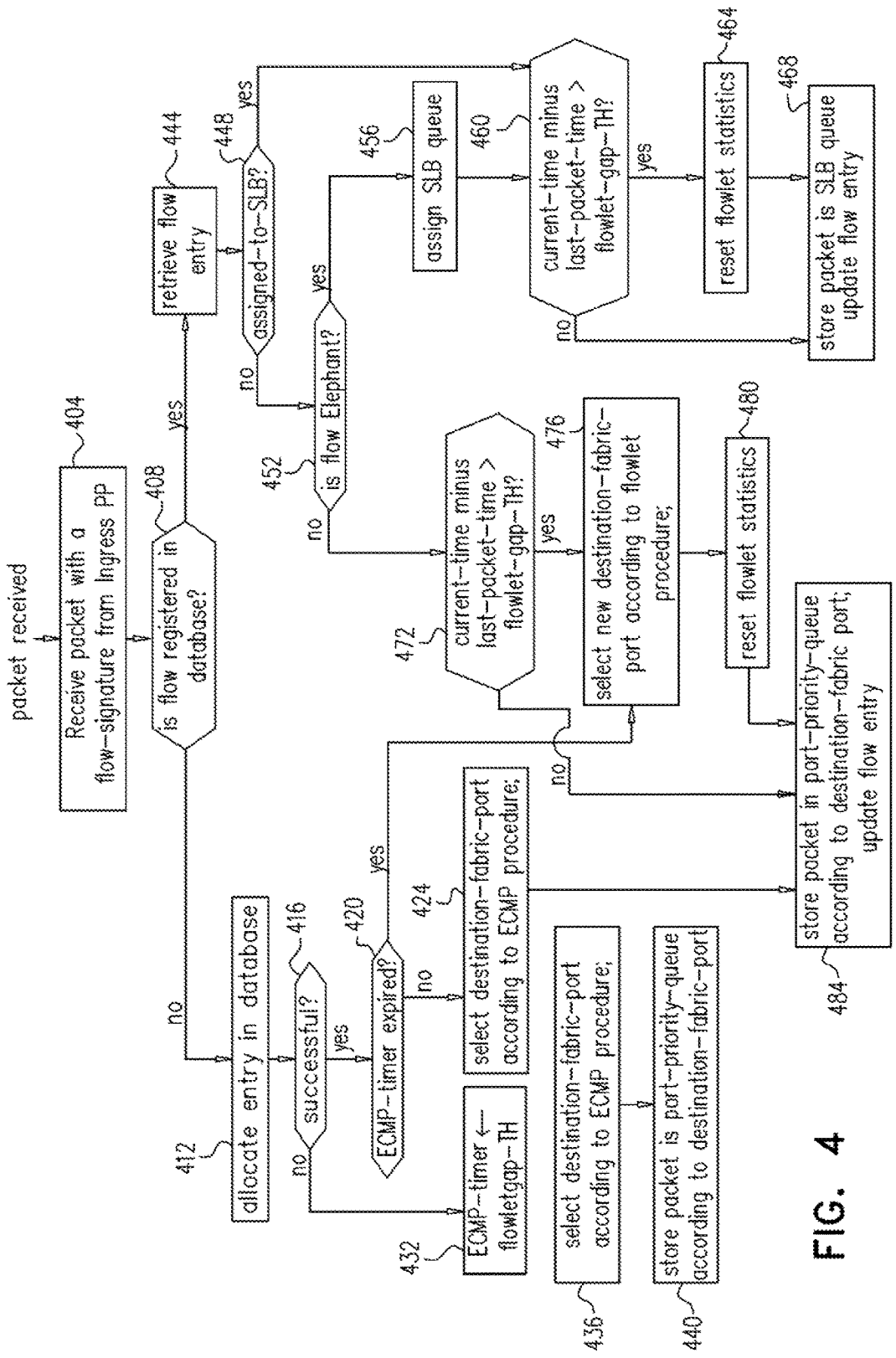
FIG. 4 is a flowchart of a method that may be performed by a Flowlet Load Balancer, in accordance with some demonstrative embodiments.

FIG. 4 is a flowchart of a method that may be performed by the Flowlet Load Balancer in accordance with some demonstrative embodiments. The flowchart depicts the operation of the Flowlet Load Balancer when ECMP/FLB or SLB may be applied to a packet (or in other words when ECMP/FLB or SLB load balancing schemes are enabled). The boxes numbered in the flowchart may represent stages of the method. For example, the Flowlet Load Balancer may be the Flowlet Load Balancer depicted in FIG. 3.

In some demonstrative embodiments, a packet that is to be transmitted via an output fabric port may be received with the flow-signature at the Flowlet Load Balancer from the ingress packet processor, assuming that the Load Balancer is at the ingress switch (404). If the Load Balancer is instead at the source host or tunnel endpoint, stage 404 may include the Flowlet Load Balancer classifying the packet that was received at the Flowlet Load Balancer to a flow, e.g. by generating a flow signature, as described above.

In some demonstrative embodiments, the Flowlet Load Balancer may then determine if the flow is already registered in a database (408). If the flow is not already registered in a database then the Flowlet Load Balancer may attempt to allocate an entry in a database to the flow (412). Table 1, below, shows the fields of a flow tracking entry in a database, and explanations of these fields, in accordance with some demonstrative embodiments. In some demonstrative embodiments, a flow tracking entry may include fewer, more and/or different fields than shown in Table 1. For example, if there is only one possible output port for the flow, then the flow-LBG-ID field may be omitted. Table 1 may be referred to when describing FIG. 4.

TABLE 1 flow tracking entry

| Field | Meaning |
| --- | --- |
| flow-LBG-ID | The LBG assigned to the flow. Used to handle potential collisions of flow signature |
| FIN-received | indicates that a FIN was received for this flow, thus flow-aging-FIN-TH is applied in the aging process |

TABLE 1-continued flow tracking entry

| Field | Meaning |
|---|---|
| last-packet-time | time when the last packet of the flow was observed |
| assigned-to-SLB-queue | flag that indicates flow is assigned to an SLB queue |
| assigned-SLB-queue | the SLB queue that is assigned to the flow |
| output-fabric-port | The fabric-port that the flow is assigned to. Used when flowlet load balancing applied |
| flowlet-byte-count | the number of bytes received since the start of the flowlet (i.e., time elapsed since last packet of the flow is greater than a threshold) |
| flowlet-packet-count | the number of packets received since the start of the flowlet |

In some demonstrative embodiments, the database that is associated with Flowlet Load Balancer may be included in Flowlet Load Balancer (See, for instance FIG. 3) or may be external to the Flowlet Load Balancer. In some of these embodiments, the database may be searched by e.g. flow signature.

In some demonstrative embodiments, if the allocation of an entry to the database was unsuccessful (416), then the Flowlet Load Balancer may set an ECMP timer to a flowlet threshold gap (432) (also referred to as minimum gap, as described above). The Flowlet Load Balancer may select a path to be the current path in accordance with ECMP (436). For example, if the Flowlet Load Balancer is at an ingress switch, e.g. TOR, an output fabric port (See e.g., FIG. 2) may be selected as the current port in accordance with ECMP. The output fabric port is also referred to in FIG. 4 as "destination fabric port". A port selected in accordance with ECMP may be a port from among a group of ports identified by a flow LBG ID. The Flowlet Load Balancer packet may store the packet in a port priority queue associated with the current path, e.g. in one of the priority queue(s) associated with the selected output fabric port (440).

In some demonstrative embodiments, if the allocation of an entry in the database is instead successful (416), Flowlet Load Balancer may determine if an ECMP timer has expired (420). If the ECMP timer has not expired, e.g. the inter-packet gap is not longer than the minimum gap, then there may be a risk that this packet may belong to a flow associated with a previously unsuccessful registration attempt and that the difference between the packet most recently received at the Flowlet Load Balancer that belongs to the flow associated with a previously unsuccessful registration attempt and this packet may be less than the minimum gap. Therefore Flowlet Load Balancer may select a path to be the current path in accordance with ECMP (424), e.g. as described above, so that if this packet belongs to the flow associated with a previously unsuccessful registration attempt, this packet may be sent along the same path as the most recently received packet that belongs to this flow. For example, if the Flowlet Load Balancer is at an ingress switch e.g. TOR, this packet may be sent via the same output fabric port as the most recently received packet that belongs to the flow associated with a previously unsuccessful registration attempt. The Flowlet Load Balancer packet may store the packet in the port priority queue associated with the selected path, e.g. in one of the priority queue(s) associated with the selected output fabric port, and field(s) in the flow entry of the database may be filled in (484). For example, any of the flow LBG-ID, output fabric port, flowlet byte count, or flowlet packet count fields in the flow tracking entry (See e.g. Table 1) may be filled in for the current flow LBG-ID, selected port, the bytes of the current packet and the current packet. The flowlet byte count field may show e.g., the number of bytes received from the start of the current flowlet. The flowlet packet field may show e.g. the number of packets received from the start of the current flowlet.

In some demonstrative embodiments, if the allocation of the entry was successful and the ECMP timer has expired (420), the Flowlet Load Balancer may in accordance with FLB select a path to be the current path (476). For example, an output fabric port from a group of ports identified by the flow LBG ID (see e.g. Table 1) may be selected to be the current port. Even if this packet belongs to a flow associated with a previously unsuccessful registration attempt, the difference between the packet most recently received at the Flowlet Load Balancer of the flow associated with a previously unsuccessful registration attempt and this packet may be more than the minimum gap. Therefore, this packet may not be required to be sent along the same path as the most recently received packet that belongs to the flow associated with a previously unsuccessful registration attempt. The Flowlet Load Balancer may reset the flowlet statistics (480), e.g. any of flowlet byte count, or flowlet packet count. The Flowlet Load Balancer packet may store the packet in the port priority queue associated with the current path, e.g. associated with the selected output fabric port, and may fill in field(s) in the flow entry (484). For example, any of the flow LBG-ID output fabric port, flowlet byte count, or flowlet packet count fields in the flow tracking entry (See e.g. Table 1) may be filled in for the current flow LBG-ID, selected port, the bytes of the current packet and the current packet.

In some demonstrative embodiments, if the flow is already registered in the database (408), then the Flowlet Load Balancer may retrieve the flow entry from the database (444) and check if the flow is assigned to SLB (448). For example, the Flowlet Load Balancer may check the field in the entry that flags whether or not the flow is assigned to an SLB queue (See e.g. Table 1).

In some demonstrative embodiments, if the flow is not assigned to SLB, the Flowlet Load Balancer may check if the flow is an elephant (452), e.g. as described above. For example, the Flowlet Load Balancer may determine whether or not the flow is an elephant dependent on the current flowlet-byte count and/or the flowlet packet count. If the flow is an elephant flow, and/or possibly for a different reason, the flow may be assigned to an SLB queue (456).

In some demonstrative embodiments, if the flow is assigned to SLB in stage 456 or it was found in stage 448 that the flow was already assigned to SLB, then the Flowlet Load Balancer may determine whether the inter-packet gap, or in other words the time that has elapsed since the last (meaning here: preceding) packet from the flow, is greater than the flowlet gap threshold (460). The inter-packet gap may be determined, e.g. by comparing the time of the current packet to the time of the last (meaning here: preceding) packet from the flow indicated in a "last packet time" field of a flow tracking entry for the flow (see e.g. Table 1). If the inter-packet gap is greater than the threshold then the Flowlet Load Balancer may reset the flowlet statistics (464), e.g. flowlet byte count and flowlet packet count. The Flowlet Load Balancer, after resetting the flowlet statistics, or if the inter-packet gap was less than the threshold, may store the packet in the assigned SLB queue and update the flow entry (468). For example, the Flowlet Load Balancer may update any of "assigned to SLB" field or "assigned SLB queue" in the flow tracking entry (see e.g. Table 1) in order to set a flag to indicate that the flow is assigned to an SLB queue, and/or to note the SLB queue to which the flow is assigned. The Flowlet Load Balancer may also update the flowlet byte count and flowlet packet count for the bytes of the current packet and for the current packet. For instance, the flowlet byte count and/or flowlet count fields may be used for monitoring purposes even under SLB. The Flowlet Load Balancer may optionally remove reference to an output fabric port if FLB or ECMP was previously applied to the flow.

In some demonstrative embodiments, if the flow is determined to not be an elephant in stage 452, then the Flowlet Load Balancer may determine whether the inter-packet gap, meaning the time that has elapsed since the last (meaning here: preceding) packet in the flow, is greater than the flowlet gap threshold (452). The inter-packet gap may be determined, e.g. by comparing the time of the current packet to the time of the last (meaning here: preceding) packet from the flow indicated in a "last packet time" field of a flow tracking entry for the flow (see e.g., Table 1). If the time is greater, then the Flowlet Load Balancer may in accordance with FLB select a path for the current path (476), e.g. as described above. For example the Flowlet Load Balancer may select an output fabric port from the group of ports identified by the Flow LBG-ID (see e.g. Table 1), e.g. as described above. The current path, e.g. current port may be the same or different than the path, e.g. port, than was used for the last (meaning here: preceding) packet in the flow, e.g. as described above. The Flowlet Load Balancer may reset the flowlet statistics (480), e.g. any of fabric port, flowlet byte count, or flowlet packet count. The Flowlet Load Balancer packet may store the packet in the port priority queue in accordance with the selected path, e.g. in accordance with the selected output fabric port, and may update the flow entry (484). For example, any of the output fabric port, flowlet byte count, or flowlet packet count fields in the flow tracking entry (See e.g. Table 1) may be updated, if necessary, for the selected port, bytes of current packet and current packet.

In some demonstrative embodiments, if the flow was not an elephant and the time that has elapsed since the last (meaning here: preceding) packet in the flow is less than the flowlet gap threshold (472), then the Flowlet Load Balancer packet may select the path used for the preceding packet of the flow, e.g. select the port used for the preceding packet of the flow. The Flowlet Load Balancer packet may store the packet in the port priority queue associated with the path taken by the preceding packet of the flow, e.g. associated with the output fabric port noted in the flow tracking entry (See e.g. "output fabric port" field of Table 1), and may update the flow entry (484). For example, the flowlet byte count, or flowlet packet count fields in the flow tracking entry (See e.g. Table 1) may be updated for the bytes of the current packet and the current packet.

In some demonstrative embodiments, the method performed by the Flowlet Load Balancer may differ from the flowchart of FIG. 4. For example, SLB may be applied exclusively and/or may be applied initially to a flow in addition to or instead of based on flowlet-byte count and/or the flowlet packet count. For example, there may be differentiation based on priority for SLB queues. For example, there may be more, less and/or different stages than shown in the flowchart. For example, stages of a method performed by the Flowlet Load Balancer may be performed in a different order than shown in FIG. 4. For example, stages which are shown in FIG. 4 as being performed sequentially may be performed in some demonstrative embodiments in parallel, and/or actions which are shown in FIG. 4 as being performed in one stage, may be performed in some demonstrative embodiments sequentially.

In some demonstrative embodiments, in addition to or instead of the method described with respect to FIG. 4, an aging procedure may be applied such that flows without activity for a certain period may be deleted from the tracking database and potentially allocated SLB queues of these flows may be freed. For example, a FIN (e.g. TCP) signal may be received when a flow ends, and may be stored in a field of the flow entry (See e.g. Table 1). In this example, when a FIN signal is received, the associated flow may be aged out. For another example, when a flow that is assigned to SLB e.g. according to its Elephant status is determined to be non-active (e.g. based on no-activity timer) and when the corresponding SLB queue is empty, the SLB queue may be freed, becoming available for new SLB flows.

In some demonstrative embodiments, the Segment Load Balancer (also referred to as "Ingress Segment Balancer", "ing SLB" or "ingress SLB") may be configured to segment flows according to a segmentation criterion, for example, including the WCD criteria, e.g., as described above, the WCS criteria, e.g., as described above, and/or any other criteria.

In some demonstrative embodiments, when, for example, a new SLB queue is set up or a segment boundary is encountered, the Segment Load Balancer may arrange for all packets belonging to the first or new segment to be transmitted via a same path, e.g. same output port. The Segment Load Balancer may arrange this by e.g. mapping the SLB queue to an output fabric port selected from among the ports identified by the flow LBG ID, using a selection scheme. The selection scheme may employ, for example, randomness and fabric port load consideration, as indicated for example by the port output queue size. One implementation may select two alternative ports randomly and then select the least loaded one among the two. Other selection schemes may be used. Additional or alternative ways to arrange that all the packets of the first or new segment will be transmitted via the same path were described above (e.g. VLAN tag, entropy label, etc.).

Figure 5:
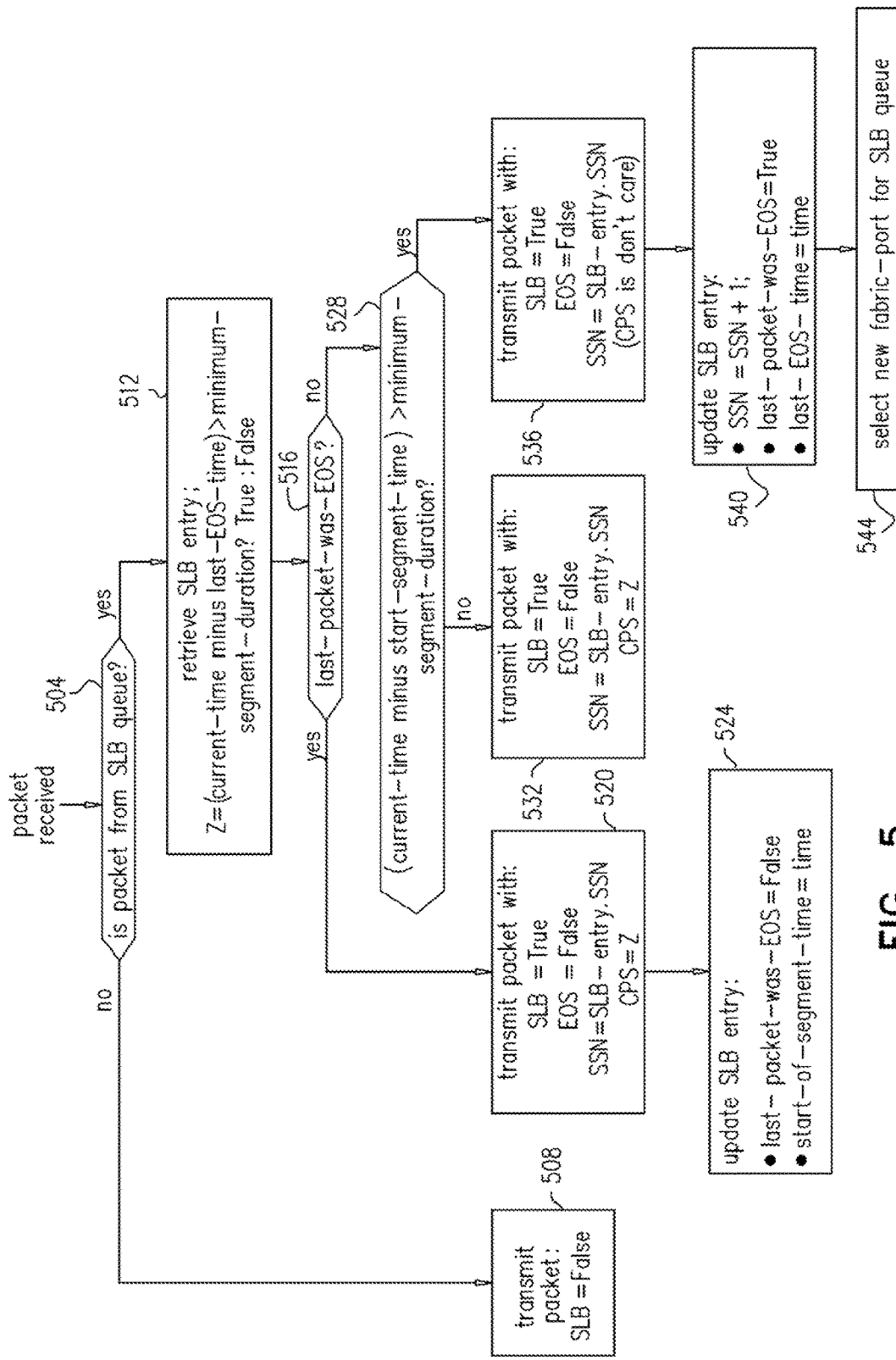
FIG. 5 is a flowchart of a method that may be performed by a Segment Load Balancer, in accordance with some demonstrative embodiments.

FIG. 5 is a flowchart of a method that may be performed by the (Ingress) Segment Load Balancer, in accordance with some demonstrative embodiments. For example, the Segment Load Balancer may be the Segment Load Balancer depicted in FIG. 3. The boxes numbered in the flowchart may represent stages of the method.

Table 2, below, shows the fields of an SLB queue attribute entry in a database, and explanations of these fields, in accordance with some demonstrative embodiments. The Segment Load Balancer may maintain an entry in the database per SLB queue. In some demonstrative embodiments, an SLB queue attribute entry may include fewer, more and/or different fields than shown in Table 2. For example, if there is only one possible output port per SLB queue, the flowlet-LBG-ID may be omitted. Table 2 will be referred to when describing FIG. 5.

TABLE 2

| | SLB queue attribute entry |
|---|---|
| start-of-segment-time | Time when the first packet of the segment was transmitted |
| SSN | The sequence number of the current segment |
| last-packet-was-EOS | Flag that indicates that the last packet that was transmitted was marked as End-of-Segment |
| flow let-LBG-ID | The flowlet-LBG-ID that is associated with the queue. This may be used to select a new output fabric-port once the EOS packet is transmitted |

TABLE 2-continued

| | SLB queue attribute entry |
|---|---|
| last-EOS-packet-time | The time when the last EOS packet of a previous segment was transmitted. This may be used to decide when to indicate Close Previous Segment (CPS) when transmitting a packet |

In some demonstrative embodiments, the database that is associated with Segment Load Balancer may be included in Segment Load Balancer or may be external to the Segment Load Balancer. Typically although not necessarily this database may be significantly smaller than the database associated with the Flowlet Load Balancer, so terming these entries as a "database" should not be considered to imply characteristics thereto.

In some demonstrative embodiments, when the Segment Load Balancer receives a packet from a port priority queue or from an SLB queue (See e.g. above description of FIG. 4), the Segment Load Balancer may determine if the packet is from an SLB queue (504). If not, then the Segment Load Balancer may tag the packet as not being SLB and transmit the packet on the path (e.g. via the port) determined in FIG. 4 (508). For example, if the Segment Load Balancer is at an ingress switch, the packet may be placed in the port output queue (See e.g. FIG. 3) of the port determined in FIG. 4 so that the packet may be transmitted in turn via the spine interconnect.

In some demonstrative embodiments, if the packet is received from an SLB queue (504), then the Segment Load Balancer may retrieve the SLB queue attribute entry (for the queue from which the packet was received) from the database (512). The Segment Load Balancer may determine whether or not to flag the current packet as a Close Previous Segment Packet (CPS) dependent on whether the time that has elapsed since transmission of the last EOS packet of a previous segment (or in other words the most recently transmitted EOS packet) is larger or smaller than a minimum segment time duration. The time of the most recently transmitted EOS packet may be a field in the SLB queue entry (See e.g. "last-EOS-packet-time field in Table 2). The minimum segment time duration may be determined e.g. by any of the possible segmentation criterion discussed above. If the time that has elapsed is larger than the minimum segment time duration, then the current packet may be flagged as a CPS (z=true), and if the time that has elapsed is smaller, then the current packet may not be flagged as a CPS (z=false).

In some demonstrative embodiments, the Segment Load Balancer may determine whether or not the last (meaning here: preceding) packet, was an EOS packet (516). For example there may be a field in the SLB queue attribute entry indicating whether or not the preceding packet was EOS (See e.g. "last-packet-was-EOS" field in Table 2).

In some demonstrative embodiments, if the last (meaning here: preceding) packet was not an EOS packet (516), then the Segment Load Balancer may determine whether the time that has elapsed from the start of the current segment is larger than the minimum segment duration (528). For example, the start time of the current segment may be specified in a field of the SLB queue attribute entry (See e.g. "start-of-segment-time" field in Table 2).

In some demonstrative embodiments, if the elapsed time is less than the minimum time duration (528), the Segment Load Balancer may tag the current packet with one or more tags e.g. indicating that SLB is being applied, that the packet is not an EOS packet, whether or not the packet is a CPS, and the sequence identifier (e.g. sequence number) of the current segment (532). The sequence identifier of the current segment may be specified in a field of the entry (See e.g. SSN field of Table 2). The Segment Load Balancer may arrange for the packet to be transmitted along the same path as the preceding packet from the SLB queue. For example, the packet may be placed in the port output queue (See e.g. FIG. 3) of the port used for previous packet(s) of the segment so that the packet may be transmitted in turn via the spine interconnect.

In some demonstrative embodiments, if the elapsed time is more than the minimum time duration (528), the Segment Load Balancer may tag the current packet with one or more tags e.g. indicating that SLB is being applied, that the packet is an EOS packet, and the sequence identifier of the current segment (536). As the current packet is an EOS, whether or not the packet is also a CPS may be irrelevant. The Segment Load Balancer may arrange for the packet to be transmitted along the same path as the preceding packet from the SLB queue. For example, the packet may be placed in the port output queue (See e.g. FIG. 3) of the port used for previous packet(s) of the segment so that the packet may be transmitted in turn via the spine interconnect.

In some demonstrative embodiments, following stage 536, Segment Load Balancer may update the SLB entry so that a new segment will start with the next packet (540). For example, the segment sequence identifier, e.g. SSN (See e.g. Table 2) may be updated to another segment sequence identifier. The other segment sequence identifier may be, for instance, the next available sequence number, where the next available sequence number may be the sequence number of the current segment incremented by one, the next sequence number from a limited group, (e.g. 1 if the SSN is currently 0, or 1 if the SSN is currently 0; 0, 1, 2 depending on whether the SSN is currently 2, 0, or 1, respectively; etc.), etc. Although these instances refer to sequence numbers, the sequence identifier may not necessarily be a number and may be any identifier that identifies the sequence. The "last packet was EOS" field (See e.g. Table 2) may, for instance, be updated to true, and the "last EOS packet time" field (See e.g. Table 2) may, for instance, be updated to the current time. The Segment Load Balancer may select a (new) path for the SLB queue (544), to be used starting with the next packet, e.g. select a new output fabric port for the SLB queue. The selected (new) path may be the same or different than the path used for the current (EOS) packet, e.g. the selected (new) output fabric port may be the same or different than the one used to transmit the current packet. For example, the Segment Load Balancer may use the flowlet LBG ID specified in a field of the entry (see Table 2) to select a fabric port from among the ports identified by the flowlet LBG ID. This may result in the SLB queue attribute being updated for the selected fabric port, e.g. if different than before.

In some demonstrative embodiments, if the last (meaning here: preceding) packet was an EOS packet (516) then the Segment Load Balancer may tag the current packet with one or more tags, e.g. indicating that SLB is being applied, that the packet is not an EOS packet, whether or not the packet is a CPS, and the sequence identifier (e.g. sequence number) of the current segment (520). Note that the current segment sequence identifier may be the identifier that was updated in 540. The Segment Load Balancer may arrange for the packet to be transmitted along the new path selected in stage 544. For example, the packet may be placed in the port output queue (See e.g. FIG. 3) of the port selected in stage 544 so that the packet may be transmitted in turn via the spine interconnect. Segment Load Balancer may, for instance, update the SLB queue attribute entry (See e.g. Table 2) to update "the last-packet-was-EOS" field to false and to set the "start-of-segment-time" to the current time (524)

In some demonstrative embodiments, the method performed by the Segment Load Balancer may differ from the flowchart of FIG. 5. For example, there may be more, less and/or different stages than shown in the flowchart. For example, stages of a method performed by the Segment Load Balancer may be performed in a different order than shown in FIG. 5. For example, stages which are shown in FIG. 5 as being performed sequentially may be performed in some demonstrative embodiments in parallel, and/or actions which are shown in FIG. 5 as being performed in one stage, may be performed in some demonstrative embodiments sequentially.

Figure 6:
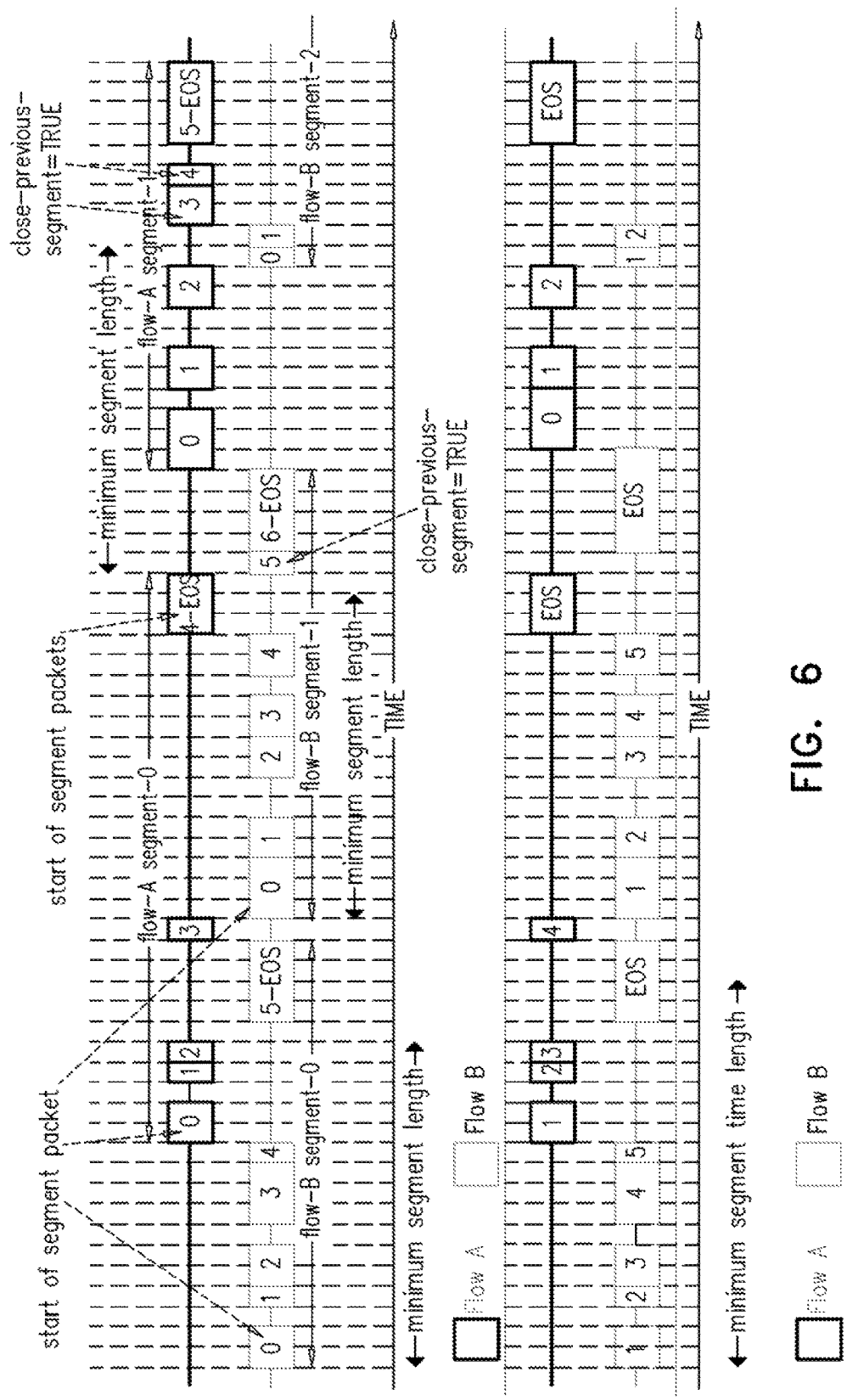
FIG. 6 is a schematic illustration of a segmentation of two flows, in accordance with some demonstrative embodiments.

FIG. 6 is a schematic illustration of segmentation of two flows, in accordance with some demonstrative embodiments. For example, a Segment Load Balancer such as the ingress segment load balancer depicted in FIG. 3 may be configured to segment the flows of FIG. 6.

In some demonstrative embodiments, the Segment Load Balancer may receive the two SLB flows from the SLB flow queues.

In some demonstrative embodiments, the Segment Load Balancer may be configured to segment the flows according to a minimum segment time duration, e.g., as shown in FIG. 6.

In some demonstrative embodiments, as shown in FIG. 6, the Segment Load Balancer may segment the flow A into two segments, and the flow B into three segments. The EOS packet of the third segment of flow B is not shown, for example because additional packets of the flow B may be added to the third segment, e.g., if the minimum time duration is still not reached, or because the flow may have ended.

In some demonstrative embodiments, as shown in FIG. 6, the Segment Load Balancer may tag each packet with an indication configured to indicate whether the packet is SLB or non-SLB.

In some demonstrative embodiments, as shown in FIG. 6, the segment load balancer may be configured to tag SLB packets with a segment sequence identifier (e.g. number, SSN).

In some demonstrative embodiments, as shown in FIG. 6, the Segment Load Balancer may be configured to tag a last SLB packet of a segment with an indication ("End-of-Segment flag") to indicate the packet is a final packet in the segment.

In some demonstrative embodiments, SLB packets may be tagged with a Close-Previous Segment flag as depicted for packet numbers 3 and 4 of the second segment of flow A, and packet number 5 of the second segment of flow B.

In some demonstrative embodiments, packets may be scheduled from the port-priority queues and the SLB flow queues, and may be transmitted out of the fabric port.

In some demonstrative embodiments, when packets are transmitted e.g. to the fabric the SLB flag and/or the segment sequence identifier (e.g. SSN) may be encoded in the packets. Additionally or alternatively, any of the End-of-Segment flag, close-previous segment flag or an explicit flow ID may be encoded in a packet. In some of these embodiments, one or more of these encodings may be decoded by a Reorderer at the reordering point e.g. at the egress TOR, destination host, or tunnel endpoint.

In some demonstrative embodiments, when using the WCS and/or WCD segmentation rule(s), a minimum of 1-bit segment sequence identifier (e.g. SSN) may be required to identify a packet as a member of an earlier or later segment.

In some demonstrative embodiments, use of a larger range segment sequence identifier (e.g. an SSN of more than 1 bit) may be advantageous, for example, to enable to identify rare cases of exceptional delay that may result in having packets from more than two active segments of the same flow at the egress. Additionally or alternatively, a larger range of segment sequence identifier (e.g. SSN) may enable better configuration error detection, improving the robustness of the solution.

In some demonstrative embodiments, 3 levels segment sequence identifier (SSN) or more may be used.

In some demonstrative embodiments, an encoding of the SLB information in the packet may be performed, for example, dependent on networking protocols employed at the datacenter network.

In some demonstrative embodiments, a number of states (or bits) that may be required for tagging the packets may be relatively low, allowing for tagging the packets in a non-disruptive way, for example, even without introducing additional proprietary headers or fields to the packet headers.

Figure 7:
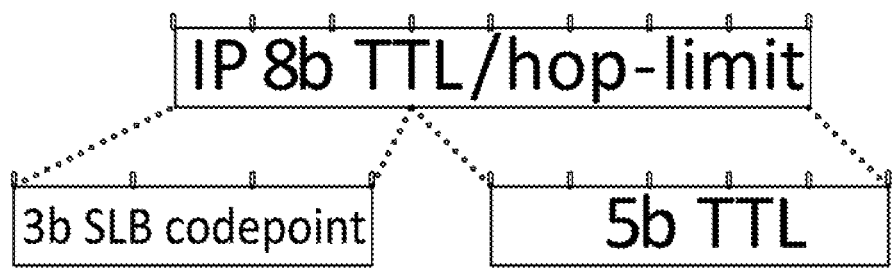
FIG. 7 is a schematic illustration of a packet-encoding scheme, in accordance with some demonstrative embodiments.

In some demonstrative embodiments, a minimum number of tags may be encoded into the ("Time to Live") TTL/hop-limit of an IP packet, e.g., as shown in FIG. 7, which illustrates a packet encoding scheme, in accordance with some demonstrative embodiments. In some demonstrative embodiments, any other encoding scheme may be used.

In some demonstrative embodiments, using the TTL/hop-limit field may utilize the fact that the SLB information may require only 7 code points (3 bits) for operation.

In some demonstrative embodiments, using the TTL, packets that enter the ingress TOR may be considered eligible for SLB, for example, only if their TTL is above a configured threshold (e.g., 255, equivalent to eight bits of 1, or any relatively high number). The SLB eligible packets may be assigned a first TTL value, e.g., a TTL value of 8 bits comprising 000_11111, when transmitted from the ingress load balancing endpoint, e.g., if they are not segment load balanced. When packets are segment load balanced they may be transmitted with a second TTL value, e.g., a TTL value of 8 bits comprising YYY_11111, where YYY corresponds, for example, to the code that fits the packet SSN and EOS status.

In some demonstrative embodiments, an additional or alternative option for IPv4 packets may be using the Identification or the Offset fields in the IPv4 header. These fields may normally be used for packet fragmentation operation. However, in a datacenter environment it may often be practical to assume no fragmentation, thus these fields may be used to carry the SLB information instead. Since these fields may support more information, the segment sequence identifier (e.g. SSN) may be expanded in these cases.

In some demonstrative embodiments, an additional or alternative option for IPv6 packets is using the flow label field in the IPv6 header. Standard wise this field may be used to identify a flow for intermediate switches and routers for which packet order is to be maintained per destination and source address. Encoding the SLB information in this field may be beneficial, since SLB by definition may require maintaining segment packet order, consistent with the field definition.

In some demonstrative embodiments, an additional or alternative option for L3 forwarding may be to add a shim header e.g. a GRE header with a type field indicating SLB information.

In some demonstrative embodiments, an additional or alternative option for L2 forwarding may be a VLAN tag.

Referring again to reordering, in some demonstrative embodiments, a Reorderer at the reordering point, such as at egress switch, e.g. egress TOR, destination host or tunnel endpoint may be configured to receive packets, e.g., through an input fabric port. The Reorderer may be configured to classify the received packets to a flow, for example, in a manner similar to the manner in which the ingress TOR, source host, or tunnel endpoint classifies packets to flow, e.g., native-socket. Additionally or alternatively, in some demonstrative embodiments an ingress TOR, source host or tunnel endpoint may have tagged a packet with an explicit flow-ID, thereby eliminating the need for the Reorderer at the reordering point to classify packets to flows.

In some demonstrative embodiments, the Reorderer at the reordering point such as at egress switch, e.g. egress TOR, destination host or tunnel endpoint may be configured to identify the packets as SLB or non-SLB, e.g., based on the SLB/non-SLB indication decoded from the packet.

In some demonstrative embodiments, the Reorderer at the reordering point such as at egress switch, e.g. egress TOR, destination host or tunnel endpoint may be configured to, e.g., if a packet is an SLB packet, decode certain data from the packet such as the sequence session identifier e.g. SSN, End-of-Segment data, and/or other data.

In some demonstrative embodiments, the Reorderer at the reordering point such as at egress switch, e.g. egress TOR, destination host or tunnel endpoint may be configured to apply (segment) Reordering, e.g., to packets that are SLB.

In some demonstrative embodiments, the Reorderer may be configured to track the SLB flows.

In some demonstrative embodiments, the Reorderer may be configured to maintain segment buffers per flow. For example, these buffers may be included in memory in the Reorderer or may be included in memory external to the Reorderer. In some of these embodiments, when a packet is received, the packet may be stored in a first in first out (FIFO) buffer in accordance with the flow and segment to which the packet belongs. The Reorderer may maintain which segment (e.g. corresponding segment sequence identifier such as SSN) is current per flow, where the earliest segment which is currently being handled for the flow by the Reorderer may be considered to be the current segment. Packets may be read out of the FIFO buffer assigned to the current segment sequence identifier (e.g. SSN) until an EOS packet is encountered or an EOS packet loss is detected for the segment. Once the EOS packet is encountered or EOS packet loss is detected, the segment sequence identifier (e.g. SSN) representative of the following segment may be considered to be the newly current segment sequence identifier (e.g. SSN), and reading may commence from the FIFO buffer assigned to the newly current segment sequence identifier (e.g. SSN).

In some demonstrative embodiments, the Reorderer may be implemented in many ways. One way may be to use a two dimensional linked list structure, e.g. linking the FIFO buffer. For example, the linked lists may include a first dimension of the packets within the segment, and/or a second dimension of the segments themselves.

In some demonstrative embodiments, loss of an End-of-Segment packet may be determined (e.g. detected, assumed) at the egress switch or destination host, for example, when a (segment) timeout timer expires, a packet that belongs to a segment which is at least two later than the current segment (e.g. whose SSN is bigger than the current-SSN by two or more) is received, or when a packet, from a segment after the current segment, having an asserted close-previous-segment flag, is received.

In some demonstrative embodiments, a (segment) timeout timer may be reset, for instance, for every packet received for a given segment. For example, if the timer expires, the Reorderer may assume that the corresponding segment has ended, e.g., and may stop waiting for the End-of-Segment packet, assuming that the End-Of-Segment packet was lost. Additionally or alternatively, a timeout timer may be reset, for instance, each time an empty buffer receives a packet (or in other words every time a segment starts). For example, if the timer expires, the Reorderer may assume that an earlier segment has ended, e.g., and may stop waiting for the End-of-Segment packet, assuming that the End-Of-Segment packet was lost. Additionally or alternatively, a timeout timer may be reset, for instance, whenever an End-of-Segment packet is received. For example, if the timer expires, the Reorderer may assume that the segment following the segment with the End-of-Segment packet has ended, e.g., and may stop waiting for the End-of-Segment packet for that following segment, assuming that the End-Of-Segment packet was lost. Other timeout timer(s) may be additionally or alternatively used.

In some demonstrative embodiments, Reorderer may be associated with a database having an entry per SLB flow, that may be searched e.g. by flow signature. Each entry may include, for example one or more attributes related to the flow such as the current segment sequence identifier (e.g. identifying the segment whose packets in the FIFO buffer, if any are currently being read), time(s) relating to one or more time(s) (e.g. the last packet timestamp or in other words the time that the most recently received packet of the flow was received, reset time(s) of timeout timer(s), etc.), and/or pointer(s) of FIFO buffers. The entries may be stored, for instance, in memory in the Reorderer, or in memory external to the Reorderer.

Figure 8A:
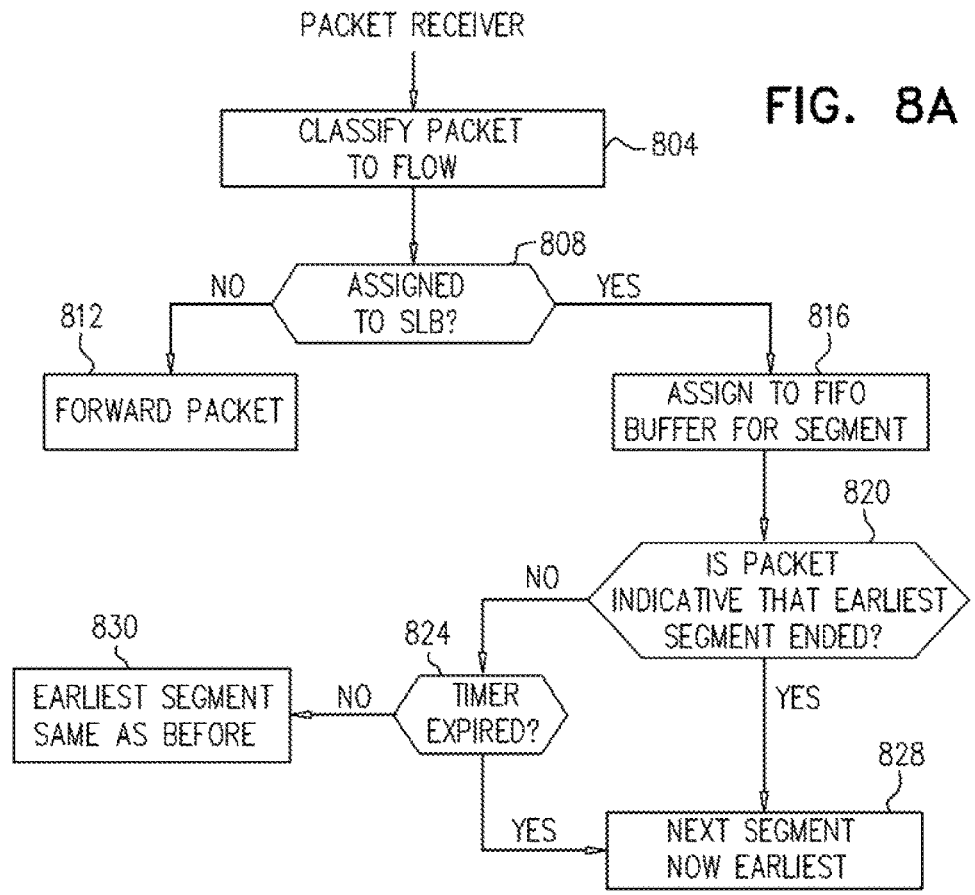
FIG. 8 (comprising FIG. 8A and FIG. 8B) is a flowchart of a method that may be performed by a Reorderer, in accordance with some demonstrative embodiments.
Figure 8B:
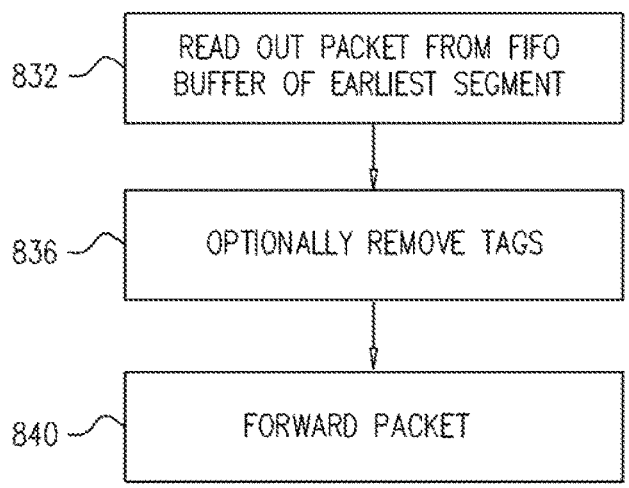

FIG. 8 is a flowchart of a method that may be performed by a Reorderer, in accordance with some demonstrative embodiments. The boxes numbered in the flowchart may represent stages of the method.

In some demonstrative embodiments, a packet may be received by the Reorderer at the reordering point, e.g. at the egress switch, destination host, or tunnel endpoint. For instance if the Reorderer is at the egress switch, the packet may be received from the input fabric port, and if the Reorderer is at the host, the packet may be received from an egress switch. Reorderer may classify the packet to a flow (804), e.g., based on native-socket or an explicit flow-ID. Reorderer may determine whether or not the flow was assigned to SLB or not (808) e.g. based on a tag in the packet.

In some demonstrative embodiments, if the flow was not assigned to SLB, then the Segment Reorderer may forward the packet (812). For example, if the reordering is being performed at an egress switch, the packet may be forwarded to an egress packet processor (PP) which may determine the output (e.g. network) port and queue the packet in the egress queue ("egr. Qing") for the output (e.g. network) port prior to transmission via the output network port ("out nwk. Port") to the destination host. For another example, if the reordering is being performed in the destination host, then the packet may be forwarded up to the protocol stack.

In some demonstrative embodiments, if the packet was assigned to SLB, then the Reorderer may assign the packet to the FIFO buffer associated with the segment sequence identifier of the packet (816). The packet may be stored along with any tags the packet may have. The Reorderer may determine whether the packet has a tag which may mean that the earliest segment that is currently being handled by the Reorderer has ended (or in other words that the segment has ended whose packets in the FIFO buffer, if any, are currently being read) (820). Examples of such as a tag may include a tag which indicates that the packet is an EOS packet of the earliest segment, a CPS packet from a later segment than the earliest segment that is currently being handled, or a packet from a segment that is two or more segments after the earliest segment that is currently being handled by the Reorderer. If the packet does not have such a tag, the Reorderer may determine whether a timeout timer, if any, has expired (824). Expiration of a timeout timer may mean that the earliest segment that is currently being handled by the Reorderer has ended (or in other words that the segment has ended whose packets in the FIFO buffer, if any, are currently being read). Possible timeout timers were discussed above. Stages 820 and/or 824 may be omitted if such tags and/or such timeout timers are not used.

In some demonstrative embodiments, if the packet included such a tag, or the timeout timer has expired, then the Segment Reorderer may categorize the segment following the earliest segment that is currently being handled as the new earliest segment (828) and the segment sequence identifier of this following segment as current, e.g. so that packets of this (following) segment may be read out of the FIFO buffer. Otherwise, the earliest segment may remain the same as before (830). The earliest segment may also be referred to as the current segment.

In some demonstrative embodiments, Segment Reorderer may read out a packet from the FIFO buffer of the earliest segment that is currently being handled (832). The reading out may be independent of the writing to buffers described above. The Segment Reorderer may remove tags from the read packet (836). Alternatively, the Segment Reorderer may not remove tags from the read packet. The Segment Reorderer may forward the packet (840). For example, if the reordering is being performed at an egress switch, the packet may be forwarded to an egress packet processor (PP) which may determine the output network port and queue the packet in the egress queue ("egr. Qing") for the output network port prior to transmission via the output network port ("out nwk. Port") to the destination host. For another example, if the reordering is being performed in the destination host, then the packet may be forwarded up to the protocol stack.

In some demonstrative embodiments, the method performed by the Reorderer may differ from the flowchart of FIG. 8. For example, there may be more, less and/or different stages than shown in the flowchart. For example, stages of a method performed by the Reorderer may be performed in a different order than shown in FIG. 8. For example, stages which are shown in FIG. 8 as being performed sequentially may be performed in some demonstrative embodiments in parallel.

In some demonstrative embodiments, in addition to or instead of the method described with respect to FIG. 8, an aging procedure may be applied to the FIFO buffers. For example, a timestamp or equivalent may be managed per FIFO buffer. The timestamp may be set every time a packet is added to the FIFO buffer. The aging procedure may identify when the buffer has inactivity over a time period exceeding a threshold, and may then read out any packets which may remain in the buffer, and free up the buffer.

As mentioned above, in some demonstrative embodiments, the Load Balancer may include hardware, software, or firmware or any combination of hardware, software and/or firmware for performing load balancing, in accordance with any of the demonstrative embodiments described herein. Similarly, as mentioned above, the Reorderer may include hardware, software, or firmware or any combination of hardware, software and/or firmware for performing reordering, in accordance with any of the demonstrative embodiments described herein.

In some demonstrative embodiments, at least part of the functions performed by the Load Balancer, Reorderer, and/or any part thereof (e.g. Flowlet Load Balancer, Segment Load Balancer, port priority queues, SLB flow queues, FIFO buffers, database(s), etc.) described above, e.g. with reference to any of FIGS. 1-8 may be performed by the hardware, software, or firmware or any combination of hardware, software and/or firmware included in Load Balancer and/or Reorderer.

In some demonstrative embodiments, one or more functionalities ascribed herein to the Load Balancer, Reorderer, and/or any part thereof, e.g. with reference to any of FIGS. 1-8 may be additionally or alternatively performed by one or more additional or alternative elements in the ingress switch (e.g. ingress TOR), egress switch (e.g. egress TOR), source host, destination host, and/or tunnel endpoint(s), and/or by the interconnect.

In some demonstrative embodiments, one or more functionalities ascribed herein to other element(s) of the ingress switch (e.g. ingress TOR), egress switch (e.g. egress TOR), source host, destination host, tunnel endpoint(s), such as port(s), port output queue(s), packet processor(s), feedback manager(s) e.g. as described above with reference to any of FIGS. 1-8, may be additionally or alternatively performed by the Load Balancer and/or the Reorderer. In some demonstrative embodiments, one or more functionalities ascribed herein to the interconnect (e.g. spine interconnect) e.g. as described above with reference to any of FIGS. 1-8, may be additionally or alternatively performed by the Load Balancer and/or the Reorderer.

In some demonstrative embodiments, hardware included in Load Balancer and/or the Reorderer may or may not include memory. Terms such as flip flop/latch, registers, memory, queue, buffer, database, and/or storage may be used to refer to any of various types of memory and/or data structure(s) in any of various types of memory, which may or may not be included in the Load Balancer and/or the Reorderer. For example, memory which may or may not be included, may be volatile or non-volatile, removable or non-removable, erasable or non-erasable memory, writeable or re-writeable memory, for short term or long term storing, and the like.

For another example, additionally or alternatively, hardware in the Load Balancer and/or the Reorderer may or may not include one or more processors. The term "processor" as used herein may refer to a processor of any suitable type operative to execute instructions, such as a load store processor, a programmable very long instruction word (VLIW) engine, etc.

For another example, additionally or alternatively, hardware included in the Load Balancer and/or the Reorderer may or may not include circuits, comprising for instance any electronic components (e.g. resistors, inductors, capacitors, diodes, transistors, other switching components, etc.) connected by connections such as wires, conductive traces, vias etc. For another example, the hardware included in the Load balancer and/or the Reorderer may or may not include one or more integrated circuits, printed circuit boards (also referred to as printed circuit board assemblies), and/or the like, that comprise memory, processor(s), electronic components, connections, etc.

In some demonstrative embodiments, hardware that is operative to perform function(s) of the Load Balancer and/or the Reorderer, may or may not be operative to perform other functionality, such as other function(s) performed by an ingress switch, an egress switch, a source host, a destination host, a tunnel endpoint, and/or functions performed by the spine interconnect. For example, in demonstrative embodiments where a printed circuit board (e.g. integrated board) may be operative to perform the functionality of ingress and/or egress switch(es), including the functionality of the Load Balancer and/or the Reorderer, the printed circuit board may include e.g. one or more (physical) ports in addition to other elements (e.g. processor(s), memory, electronic component(s), and/or connection(s), etc.).

In some demonstrative embodiments, where software is comprised in the Load Balancer and/or the Reorderer, the software may be executed by one or more processors e.g. in the Load Balancer and/or Reorderer. The term computer, as used herein should be understood to refer to any apparatus that includes one or more processors. Software (also referred to as a software module, an application, a program, a subroutine, etc.) may include instructions, which, if executed by a computer (meaning by the processor(s) in the computer), may cause the computer to perform one or more operations. For example, the performed operation(s) may include any operation(s) and/or communication(s) described herein, e.g. with reference to FIGS. 1-8. The performed operations may be operations ascribed herein to the Load Balancer and/or to the Reorderer and/or operations not ascribed herein to the Load Balancer nor to the Reorderer. The instructions (also referred to as an instruction set) may include any suitable type of instructions, such as source code, compiled code, interpreted code, executable code, static code, dynamic code, VLWI instructions, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like. Instructions may include, for example, data, words, values, symbols, and the like.

Figure 9:
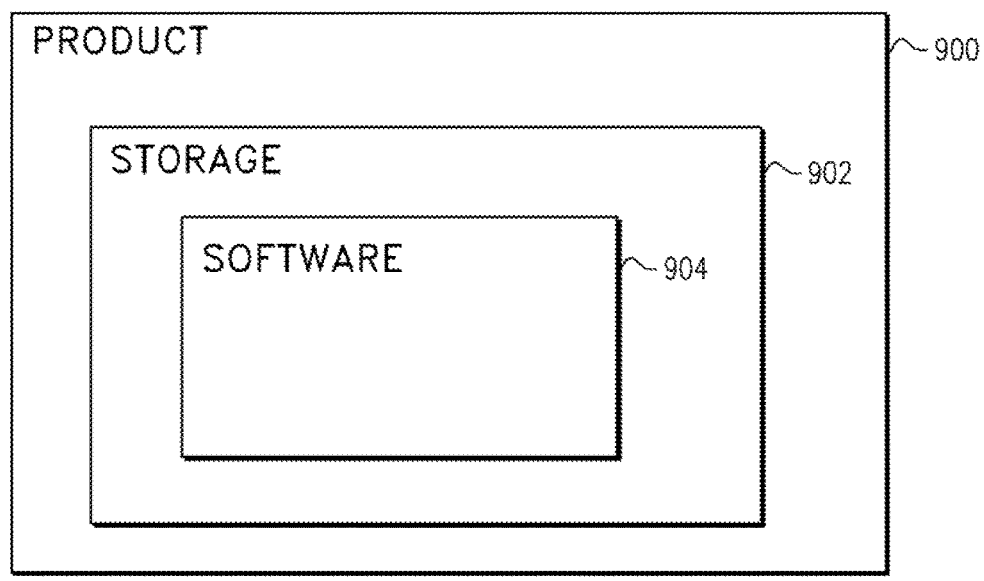
FIG. 9 is a schematic illustration of a product of manufacture, in accordance with some demonstrative embodiments.

Reference is made to FIG. 9, which schematically illustrates a product of manufacture 900, in accordance with some demonstrative embodiments. Product 900 may include a computer-readable medium 902 that includes software 904, which may be used, for example, to perform at least part of the functionality of a Load Balancer, Reorderer (e.g. egress SLB), an ingress switch (e.g. an ingress TOR), an egress switch (e.g. an egress TOR), a source host, a destination host, a Flowlet Load Balancer, a Segment Load Balancer (e.g. ingress SLB), a spine interconnect or any part thereof, and/or to perform one or more operations such as operation(s) and/or communication(s) described herein, e.g., with respect to FIGS. 1-8. The phrase "non-transitory computer-readable medium" may be directed to include any suitable computer-readable medium, with the sole exception being a transitory propagating signal.

In some demonstrative embodiments, product 900 and/or computer-readable medium 902 may include one or more types of memory capable of storing software. For example, computer-readable storage medium 902 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. Product 900 and/or computer-readable medium 902 may be remote or local to the computer which may read the computer readable medium. Product 900 and/or computer-readable medium 902 may additionally or alternatively include any suitable medium involved with downloading and/or transferring software from a remote computer to a requesting computer carried by data signals embodied in a carrier wave or other propagation medium through a communication link, e.g., a modem, radio or network connection.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
a load balancer which includes memory and electronic circuitry, the electronic circuitry including at least one of: electronic components, or one or more processors, wherein the load balancer is operative to:
receive a flow comprising a plurality of packets, the plurality of packets to be load balanced among a plurality of paths between the load balancer and a reordering point;
assign a first set of consecutive packets among the plurality of packets of the flow to a first segment and a second set of consecutive packets among the plurality of packets to a second segment according to a segmentation criterion, wherein the segmentation criterion corresponds to a property of each segment, and wherein the segmentation criterion relates at least to segment time duration;
tag each packet of the plurality of packets with a segment sequence identifier to indicate to which segment the packet is assigned;
arrange the plurality of packets for transmission via an interconnect, wherein all packets belonging to a same segment will be transmitted via a same path of the plurality of paths;
determine a worst-case-skew between an old path among the plurality of paths and a new path; and
set the segmentation criterion as a segment time duration longer than the worst-case-skew between the old path and the new path.

2. The apparatus of claim 1, wherein the load balancer is further operative to:

determine a worst-case-skew between all of the plurality of paths; and
set the segmentation criterion as a segment time duration longer than a worst-case-skew between any two paths among the plurality of paths.

3. The apparatus of claim 1, wherein the load balancer is further operative to:
determine a worst-case-delay for each of the plurality of paths; and
set the segmentation criterion as a segment time duration longer than a function of a worst-case-delay for any path among the plurality of paths.

4. The apparatus of claim 1, wherein the load balancer is further operative to set the segmentation criterion as a configured value of the segment time duration, such that the load balancer assigns a number of consecutive packets to each segment to ensure that the segment time duration is longer than the configured value.

5. The apparatus of claim 1, wherein the segmentation criterion relates at least to segment size.

6. The apparatus of claim 1, wherein said flow is a first flow of a first type, and wherein the load balancer is further operative to:
receive a second flow of a second type different than the first type;
select to assign the plurality of packets of the first flow to at least the first segment and the second segment; and
select not to assign to segments a second plurality of packets of the second flow.

7. The apparatus of claim 6, wherein the first flow of the first type comprises an Elephant flow.

8. The apparatus of claim 1, wherein the load balancer is further operative to tag a final packet per at least one segment of the flow with an End-of-Segment indication.

9. The apparatus of claim 1, wherein the load balancer is further operative to tag a final packet per at least one segment of the flow with a low drop precedence code point in order to reduce a likelihood of the final packet being dropped.

10. The apparatus of claim 1, wherein the load balancer is further operative to tag at least one packet per at least one segment of the flow with a close previous segment tag, indicative that a previous segment should be closed.

11. The apparatus of claim 1, further comprising one or more ports, wherein all packets belonging to the same segment are transmitted through a same port of the one or more ports.

12. The apparatus of claim 1, wherein all packets belonging to the same segment have at least one of: an identical entropy label, or an identical Virtual Local Area Network (VLAN) tag.

13. The apparatus of claim 1, wherein packets belonging to different segments of the flow are transmitted via at least two different paths.

14. The apparatus of claim 1, wherein said apparatus is a switch.

15. The apparatus of claim 14, wherein the switch is an ingress Top-of Rack (TOR) switch.

16. The apparatus of claim 1, wherein said apparatus is a host or a tunnel endpoint.

17. The apparatus of claim 1, wherein the apparatus and the interconnect are in a datacenter.

18. The apparatus of claim 1, wherein the electronic circuitry comprises said one or more processors, and the memory contains software for execution by said one or more processors.

19. The apparatus of claim 1, wherein each of the first segment and the second segment includes more than one packet of the plurality of packets.

20. A method comprising:
receiving a flow comprising a plurality of packets, the plurality of packets to be load balanced among a plurality of paths between a load balancer and a reordering point;
assigning a first set of consecutive packets among the plurality of packets of the flow to a first segment and a second set of consecutive packets among the plurality of packets to a second segment according to a segmentation criterion, wherein the segmentation criterion corresponds to a property of each segment, and wherein the segmentation criterion relates at least to segment time duration;
tagging each packet of the plurality of packets with a segment sequence identifier to indicate to which segment the packet is assigned;
arranging the plurality of packets for transmission via an interconnect, wherein all packets belonging to a same segment will be transmitted via a same path of the plurality of paths;
determining a worst-case-skew between an old path among the plurality of paths and a new path; and
setting the segmentation criterion as a segment time duration longer than the worst-case-skew between the old path and the new path.

21. The method of claim 20, further comprising: transmitting the plurality of packets.

22. The method of claim 20, wherein all packets belonging to the same segment are transmitted through a same port.

23. The method of claim 20, wherein packets belonging to different segments are transmitted via at least two different paths.

24. The method of claim 20, further comprising: recovering from at least one of: a link failure, a port failure, or an error in reordering the plurality of packets at the reordering point.

25. The method of claim 20, further comprising: upon inactivity for a certain period of time for the flow, aging out the flow.

26. The method of claim 20, wherein the segmentation criterion relates at least to segment size.

27. The method of claim 20, wherein all packets belonging to the same segment have at least one of: an identical entropy label, or an identical Virtual Local Area Network (VLAN) tag.

28. The method of claim 20, wherein said flow is a first flow of a first type comprising an elephant flow, further comprising:
receiving a second flow of a second type different than the first type;
selecting to assign the plurality of packets of the first flow to at least the first segment and the second segment; and
selecting not to assign to segments a second plurality of packets of the second flow.

29. The method of claim 20, further comprising: tagging at least one packet of the plurality of packets with at least one of: a low drop precedence code point, an end of segment indication, or a close previous segment tag.

30. The method of claim 20, wherein each of the first segment and the second segment includes more than one packet of the plurality of packets.

31. A product comprising one or more tangible computer-readable non-transitory storage media comprising computer-executable instructions operable to, when executed by a computer, enable the computer to implement one or more operations, the operations comprising:

receiving a flow comprising a plurality of packets, the plurality of packets to be load balanced among a plurality of paths between the load balancer and a reordering point;

assigning a first set of consecutive packets among the plurality of packets of the flow to a first segment and a second set of consecutive packets among the plurality of packets to a second segment according to a segmentation criterion, wherein the segmentation criterion corresponds to a property of each segment, and wherein the segmentation criterion relates at least to segment time duration;

tagging each packet of the plurality of packets with a segment sequence identifier to indicate to which segment the packet is assigned;

arranging the plurality of packets for transmission via an interconnect, wherein all packets belonging to a same segment will be transmitted via a same path of the plurality of paths;

determining a worst-case-skew between an old path among the plurality of paths and a new path; and setting the segmentation criterion as a segment time duration longer than the worst-case-skew between the old path and the new path.

32. The product of claim 31, wherein the operations further comprise: tagging at least one packet of the plurality of packets with at least one of: a low drop precedence code point, an end of segment indication, or a close previous segment tag.

33. The product of claim 31, wherein the segmentation criterion relates at least to segment size.

34. The product of claim 31, wherein the operations further comprise: recovering from at least one of: a link failure, a port failure, or an error in reordering the plurality of packets at the reordering point.

35. The product of claim 31, wherein each of the first segment and the second segment includes more than one packet of the plurality of packets.

\* \* \* \* \*